(12) United States Patent  
Beall et al.

(10) Patent No.: US 12,098,094 B2  
(45) Date of Patent: Sep. 24, 2024

(54) ION EXCHANGEABLE GLASSES HAVING HIGH FRACTURE TOUGHNESS

(71) Applicant: CORNING INCORPORATED, Corning, NY (US)

(72) Inventors: George Halsey Beall, Big Flats, NY (US); Qiang Fu, Painted Post, NY (US); Xiaoju Guo, Pittsford, NY (US); Peter Joseph Lezzi, Corning, NY (US); Zhihao Liao, Guangzhou (CN); Pascale Oram, Hammondsport, NY (US); Charisse Marye Spier, Horseheads, NY (US); Alana Marie Whittier, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/973,065

(22) Filed: Oct. 25, 2022

(65) Prior Publication Data

US 2023/0129031 A1    Apr. 27, 2023

Related U.S. Application Data

(60) Provisional application No. 63/271,813, filed on Oct. 26, 2021.

(51) Int. Cl.
*B32B 15/04* (2006.01)
*B32B 17/06* (2006.01)
(Continued)

(52) U.S. Cl.
CPC ............ *C03C 3/085* (2013.01); *C03C 21/002* (2013.01); *C03C 2204/00* (2013.01)

(58) Field of Classification Search
CPC ...................................................... C03C 3/085
(Continued)

(56) References Cited

U.S. PATENT DOCUMENTS 8,232,218 B2 * 7/2012 Dejneka ................. C03B 27/04
501/68
8,969,226 B2 * 3/2015 Dejneka ................. C03C 3/091
501/67

(Continued)

FOREIGN PATENT DOCUMENTS

WO        2019/127818 A1    7/2019

OTHER PUBLICATIONS

Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, Oct. 1992, pp. 1-30.

(Continued)

*Primary Examiner* — Lauren R Colgan
(74) *Attorney, Agent, or Firm* — Travis B. Gasa

(57) ABSTRACT

In embodiments, a glass includes from 45 mol % to 70 mol % $SiO_2$; from 11.5 mol % to 25 mol % $Al_2O_3$; from 2 mol % to 20 mol % $Li_2O$; from greater than 0 mol % to 10 mol % $Na_2O$; from 9 mol % to 19 mol % MgO; from 4 mol % $ZrO_2$; and from 0 mol % to 0.5 mol % $TiO_2$. In other embodiments, a glass includes from 45 mol % to 70 mol % $SiO_2$; from 4 mol % to 25 mol % $Al_2O_3$; from 5 mol % to 20 mol % $Li_2O$; from 0.1 mol % to 10 mol % $Na_2O$; from 6 mol % to 25 mol % MgO; from 0.1 mol % to 4 mol % $ZrO_2$; from 0.1 mol % to 5 mol % $K_2O$; and from 0.05 mol % to 0.5 mol % $SnO_2$.

18 Claims, 6 Drawing Sheets

(51) Int. Cl.
*C03C 3/085* (2006.01)
*C03C 21/00* (2006.01)

(58) Field of Classification Search
USPC .................................................. 428/426, 410
See application file for complete search history.

(56) References Cited

U.S. PATENT DOCUMENTS

| | | | | |
|---|---|---|---|---|
| 10,131,567 | B2* | 11/2018 | Beall | C03C 4/18 |
| 10,384,975 | B2* | 8/2019 | Yamamoto | C03C 3/087 |
| 10,501,364 | B2 | 12/2019 | Bookbinder et al. | |
| 10,906,834 | B2* | 2/2021 | Gross | C03C 3/083 |
| 11,370,696 | B2* | 6/2022 | Gross | C03C 21/007 |
| 11,401,199 | B2* | 8/2022 | Hosoda | C03C 3/085 |
| 11,485,674 | B2* | 11/2022 | Guo | C03C 3/095 |
| 11,572,305 | B2* | 2/2023 | Murayama | C03C 3/087 |
| 11,577,987 | B2* | 2/2023 | Gross | C03C 21/002 |
| 2010/0047521 | A1* | 2/2010 | Amin | C03C 3/093 |
| | | | | 428/141 |
| 2014/0023865 | A1* | 1/2014 | Comte | C03C 3/083 |
| | | | | 501/63 |
| 2014/0364298 | A1* | 12/2014 | Ohara | C03C 3/087 |
| | | | | 501/69 |
| 2016/0102011 | A1 | 4/2016 | Hu et al. | |
| 2016/0102014 | A1 | 4/2016 | Hu et al. | |
| 2016/0280589 | A1* | 9/2016 | Beall | C03C 4/0092 |
| 2017/0174556 | A1* | 6/2017 | Miyabe | C03C 3/093 |
| 2017/0297308 | A1* | 10/2017 | Golyatin | C03B 17/02 |
| 2019/0072469 | A1 | 3/2019 | Chambliss et al. | |
| 2019/0084869 | A1 | 3/2019 | Luo et al. | |
| 2019/0161386 | A1* | 5/2019 | Gross | C03C 21/002 |
| 2019/0300422 | A1* | 10/2019 | Guo | G02F 1/133308 |
| 2019/0369672 | A1 | 12/2019 | Guo et al. | |
| 2019/0382302 | A1 | 12/2019 | Xue et al. | |
| 2020/0079689 | A1 | 3/2020 | Guo et al. | |
| 2020/0102244 | A1 | 4/2020 | Li et al. | |
| 2020/0339471 | A1 | 10/2020 | Hu et al. | |
| 2021/0292226 | A1 | 9/2021 | Umada et al. | |
| 2023/0056119 | A1* | 2/2023 | Guo | C03C 3/087 |

OTHER PUBLICATIONS

Dietzel, A., "Strukturchemie des Glases", Die Naturwissenschaften, 1941, Springer. pp. 537-547.

Gulati, S.T., "Frangibility of tempered soda-lime glass sheet", Glass Processing Days, 1997, pp. 1-7.

Invitation to pay Additional fee; PCT/US2022/047707; dated Feb. 2, 2023; 10 pages; European Patent Office.

Kaur, G., et al., "Effect of modifiers field strength on optical, structural and mechanical properties of lanthanum borosilicate glasses", Journal of Non-Crystalline Solids, 2012, vol. 358, No. 18, pp. 2589-2596.

Reddy, K.P.R. et al., "Fracture Toughness Measurement of Glass and Ceramic Materials Using Chevron-Notched Specimens", J. Am. Ceram. Soc., vol. 71, No. 6, 1988, pp. C-310-C-313.

Smedskjaer, M.M., et al., "Sodium diffusion in boroaluminosilicate glasses", Journal of non-crystalline solids, 2011, vol. 357, No. 22-23, pp. 3744-3750.

Tandon, R. et al., "Controlling the fragmentaion behavior of stressed glass, in Fracture Mechanics of Ceramics", Editors. 2005, pp. 77-91.

Tiegel, M., et al., "Young?s modulus, Vickers hardness and indentation fracture toughness of alumino silicate glasses", Ceramics International, 2015, vol. 41, No. 6, pp. 7267-7275.

* cited by examiner

ION EXCHANGEABLE GLASSES HAVING HIGH FRACTURE TOUGHNESS

This application claims the benefit of priority of U.S. Provisional Application Ser. No. 63/271,813 filed on Oct. 26, 2021, the content of which is relied upon and incorporated herein by reference in its entirety.

BACKGROUND

Field

The present specification generally relates to glass compositions suitable for use as cover glass for electronic devices. More specifically, the present specification is directed to ion exchangeable glasses that may be formed into cover glass for electronic devices.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

Glass can be made more resistant to flexure failure by the ion-exchange technique, which involves inducing compressive stress in the glass surface. However, the ion-exchanged glass will still be vulnerable to dynamic sharp contact, owing to the high stress concentration caused by local indentations in the glass from the sharp contact.

It has been a continuous effort for glass makers and handheld device manufacturers to improve the resistance of handheld devices to sharp contact failure. Solutions range from coatings on the cover glass to bezels that prevent the cover glass from impacting the hard surface directly when the device drops on the hard surface. However, due to the constraints of aesthetic and functional requirements, it is very difficult to completely prevent the cover glass from impacting the hard surface.

It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass-based articles, such as thin glass sheets.

Accordingly, a need exists for glasses that can be strengthened, such as by ion exchange, and that have the mechanical properties that allow them to be formed as thin glass-based articles.

SUMMARY

According to aspect (1), a glass is provided. The glass comprising: greater than or equal to 45 mol % to less than or equal to 70 mol % $SiO_2$; greater than or equal to 11.5 mol % to less than or equal to 25 mol % $Al_2O_3$; greater than or equal to 2 mol % to less than or equal to 20 mol % $Li_2O$; greater than 0 mol % to less than or equal to 10 mol % $Na_2O$; greater than or equal to 9 mol % to less than or equal to 19 mol % MgO; greater than 0 mol % to less than or equal to 4 mol % $ZrO_2$; and greater than or equal to 0 mol % to less than or equal to 0.5 mol % $TiO_2$.

According to aspect (2), a glass is provided. The glass comprising: greater than or equal to 45 mol % to less than or equal to 70 mol % $SiO_2$; greater than or equal to 4 mol % to less than or equal to 25 mol % $Al_2O_3$; greater than or equal to 5 mol % to less than or equal to 20 mol % $Li_2O$; greater than or equal to 0.1 mol % to less than or equal to 10 mol % $Na_2O$; greater than or equal to 6 mol % to less than or equal to 25 mol % MgO; greater than or equal to 0.1 mol % to less than or equal to 4 mol % $ZrO_2$; greater than or equal to 0.1 mol % to less than or equal to 5 mol % $K_2O$; and greater than or equal to 0.05 mol % to less than or equal to 0.5 mol % $SnO_2$.

According to aspect (3), the glass of any of the preceding aspects is provided, comprising: greater than or equal to 51 mol % to less than or equal to 65 mol % $SiO_2$.

According to aspect (4), the glass of any of the preceding aspects is provided, comprising: greater than or equal to 12.0 mol % to less than or equal to 19 mol % $Al_2O_3$.

According to aspect (5), the glass of any of the preceding aspects is provided, comprising: greater than or equal to 3 mol % to less than or equal to 12 mol % $Li_2O$.

According to aspect (6), the glass of any of the preceding aspects is provided, comprising: greater than 0.25 mol % to less than or equal to 6 mol % $Na_2O$.

According to aspect (7), the glass of any of the preceding aspects is provided, comprising: greater than or equal to 10 mol % to less than or equal to 19 mol % MgO.

According to aspect (8), the glass of any of the preceding aspects is provided, comprising: greater than 0.25 mol % to less than or equal to 2 mol % $ZrO_2$.

According to aspect (9), the glass of any of the preceding aspects is provided, wherein the glass is substantially free of $TiO_2$.

According to aspect (10), the glass of any of the preceding aspects is provided, comprising: greater than or equal to 0 mol % to less than or equal to 10 mol % $B_2O_3$.

According to aspect (11), the glass of any of the preceding aspects is provided, comprising: greater than or equal to 0 mol % to less than or equal to 6 mol % $B_2O_3$.

According to aspect (12), the glass of any of the preceding aspects is provided, wherein the glass is substantially free of $B_2O_3$.

According to aspect (13), the glass of any of the preceding aspects is provided, comprising: greater than or equal to 0 mol % to less than or equal to 4 mol % $P_2O_5$.

According to aspect (14), the glass of any of the preceding aspects is provided, comprising: greater than or equal to 0 mol % to less than or equal to 3 mol % $P_2O_5$.

According to aspect (15), the glass of any of the preceding aspects is provided, wherein the glass is substantially free of $P_2O_5$.

According to aspect (16), the glass of any of the preceding aspects is provided, comprising: greater than or equal to 0 mol % to less than or equal to 3 mol % $K_2O$.

According to aspect (17), the glass of any of the preceding aspects is provided, wherein the glass is substantially free of $K_2O$.

According to aspect (18), the glass of any of the preceding aspects is provided, comprising: greater than or equal to 0 mol % to less than or equal to 3 mol % CaO.

According to aspect (19), the glass of any of the preceding aspects is provided, wherein the glass is substantially free of CaO.

According to aspect (20), the glass of any of the preceding aspects is provided, comprising: greater than or equal to 0 mol % to less than or equal to 3 mol % SrO.

According to aspect (21), the glass of any of the preceding aspects is provided, wherein the glass is substantially free of SrO.

According to aspect (22), the glass of any of the preceding aspects is provided, comprising: greater than or equal to 0 mol % to less than or equal to 5 mol % ZnO.

According to aspect (23), the glass of any of the preceding aspects is provided, wherein the glass is substantially free of ZnO.

According to aspect (24), the glass of any of the preceding aspects is provided, wherein the glass has a Kw fracture toughness greater than or equal to 0.8 MPa·m$^{0.5}$ to less than or equal to 1.0 MPa·m$^{0.5}$.

According to aspect (25), the glass of any of the preceding aspects is provided, wherein the glass has a Young's modulus greater than or equal to 80 GPa to less than or equal to 100 GPa.

According to aspect (26), a method is provided. The method comprises: ion exchanging a glass-based substrate in a molten salt bath to form a glass-based article, wherein the glass-based article comprises a compressive stress layer extending from a surface of the glass-based article to a depth of compression, the glass-based article comprises a central tension region, and the glass-based substrate comprises the glass of any of the preceding aspects.

According to aspect (27), the method of aspect (26) is provided, wherein the molten salt bath comprises $NaNO_3$.

According to aspect (28), the method of any of aspect (26) to the preceding aspect is provided, wherein the molten salt bath comprises $KNO_3$.

According to aspect (29), the method of any of aspect (26) to the preceding aspect is provided, wherein the molten salt bath is at a temperature greater than or equal to 400° C. to less than or equal to 550° C.

According to aspect (30), the method of any of aspect (26) to the preceding aspect is provided, wherein the ion exchanging extends for a time period greater than or equal to 0.5 hours to less than or equal to 48 hours.

According to aspect (31), the method of any of aspect (26) to the preceding aspect is provided, further comprising ion exchanging the glass-based article in a second molten salt bath.

According to aspect (32), the method the preceding aspect is provided, wherein the second molten salt bath comprises $KNO_3$.

According to aspect (33), a glass-based article is provided. The glass-based article comprises: a compressive stress layer extending from a surface of the glass-based article to a depth of compression; a central tension region; and a composition at a center of the glass-based article comprising: greater than or equal to 45 mol % to less than or equal to 70 mol % $SiO_2$; greater than or equal to 11.5 mol % to less than or equal to 25 mol % $Al_2O_3$; greater than or equal to 2 mol % to less than or equal to 20 mol % $Li_2O$; greater than 0 mol % to less than or equal to 10 mol % $Na_2O$; greater than or equal to 9 mol % to less than or equal to 19 mol % MgO; greater than 0 mol % to less than or equal to 4 mol % $ZrO_2$; and greater than or equal to 0 mol % to less than or equal to 0.5 mol % $TiO_2$.

According to aspect 34, a glass-based article is provided. The glass-based article comprises: a compressive stress layer extending from a surface of the glass-based article to a depth of compression; a central tension region; and a composition at a center of the glass-based article comprising: greater than or equal to 45 mol % to less than or equal to 70 mol % $SiO_2$; greater than or equal to 4 mol % to less than or equal to 25 mol % $Al_2O_3$; greater than or equal to 5 mol % to less than or equal to 20 mol % $Li_2O$; greater than or equal to 0.1 mol % to less than or equal to 10 mol % $Na_2O$; greater than or equal to 6 mol % to less than or equal to 25 mol % MgO; greater than or equal to 0.1 mol % to less than or equal to 4 mol % $ZrO_2$; greater than or equal to 0.1 mol % to less than or equal to 5 mol % $K_2O$; and greater than or equal to 0.05 mol % to less than or equal to 0.5 mol % $SnO_2$.

According to aspect (35), the glass-based article of aspect (33) is provided, wherein the compressive stress layer comprises a compressive stress greater than or equal to 400 MPa to less than or equal to 2000 MPa.

According to aspect (36), the glass-based article of any of aspect (33) to the preceding aspect is provided, wherein the central tension region comprises a maximum central tension greater than or equal to 30 MPa to less than or equal to 300 MPa.

According to aspect (37), the glass-based article of any of aspect (33) to the preceding aspect is provided, wherein the depth of compression is greater than or equal to 0.15 t to less than or equal to 0.25 t, where t is the thickness of the glass-based article.

According to aspect (38), the glass-based article of any of aspect (33) to the preceding aspect is provided, wherein the compressive stress layer comprises a compressive stress spike extending from the surface of the glass-based article to a depth of compressive stress spike, and the depth of compressive stress spike is greater than or equal to 3 μm to less than or equal to 10 μm.

According to aspect (39), the glass-based article of any of aspect (33) to the preceding aspect is provided, wherein the glass-based article has a thickness t greater than or equal to 0.2 mm to less than or equal to 2 mm.

According to aspect (40), the glass-based article of any of aspect (33) to the preceding aspect is provided, wherein the composition at the center of the glass-based article comprises: greater than or equal to 51 mol % to less than or equal to 65 mol % $SiO_2$.

According to aspect (41), the glass-based article of any of aspect (33) to the preceding aspect is provided, wherein the composition at the center of the glass-based article comprises: greater than or equal to 12.0 mol % to less than or equal to 19 mol % $Al_2O_3$.

According to aspect (42), the glass-based article of any of aspect (33) to the preceding aspect is provided, wherein the composition at the center of the glass-based article comprises: greater than or equal to 3 mol % to less than or equal to 12 mol % $Li_2O$.

According to aspect (43), the glass-based article of any of aspect (33) to the preceding aspect is provided, wherein the composition at the center of the glass-based article comprises: greater than 0.25 mol % to less than or equal to 6 mol % Na$_2$O.

According to aspect (44), the glass-based article of any of aspect (33) to the preceding aspect is provided, wherein the composition at the center of the glass-based article comprises: greater than or equal to 10 mol % to less than or equal to 19 mol % MgO.

According to aspect (45), the glass-based article of any of aspect (33) to the preceding aspect is provided, wherein the composition at the center of the glass-based article comprises: greater than 0.25 mol % to less than or equal to 2 mol % ZrO$_2$.

According to aspect (46), the glass-based article of any of aspect (33) to the preceding aspect is provided, wherein the composition at the center of the glass-based article is substantially free of TiO$_2$.

According to aspect (47), the glass-based article of any of aspect (33) to the preceding aspect is provided, wherein the composition at the center of the glass-based article comprises: greater than or equal to 0 mol % to less than or equal to 10 mol % B$_2$O$_3$.

According to aspect (48), the glass-based article of any of aspect (33) to the preceding aspect is provided, wherein the composition at the center of the glass-based article comprises: greater than or equal to 0 mol % to less than or equal to 6 mol % B$_2$O$_3$.

According to aspect (49), the glass-based article of any of aspect (33) to the preceding aspect is provided, wherein the composition at the center of the glass-based article is substantially free of B$_2$O$_3$.

According to aspect (50), the glass-based article of any of aspect (33) to the preceding aspect is provided, wherein the composition at the center of the glass-based article comprises: greater than or equal to 0 mol % to less than or equal to 4 mol % P$_2$O$_5$.

According to aspect (51), the glass-based article of any of aspect (33) to the preceding aspect is provided, wherein the composition at the center of the glass-based article comprises: greater than or equal to 0 mol % to less than or equal to 3 mol % P$_2$O$_5$.

According to aspect (52), the glass-based article of any of aspect (33) to the preceding aspect is provided, wherein the composition at the center of the glass-based article is substantially free of P$_2$O$_5$.

According to aspect (53), the glass-based article of any of aspect (33) to the preceding aspect is provided, wherein the composition at the center of the glass-based article comprises: greater than or equal to 0 mol % to less than or equal to 3 mol % K$_2$O.

According to aspect (54), the glass-based article of any of aspect (33) to the preceding aspect is provided, wherein the composition at the center of the glass-based article is substantially free of K$_2$O.

According to aspect (55), the glass-based article of any of aspect (33) to the preceding aspect is provided, wherein the composition at the center of the glass-based article comprises: greater than or equal to 0 mol % to less than or equal to 3 mol % CaO.

According to aspect (56), the glass-based article of any of aspect (33) to the preceding aspect is provided, wherein the composition at the center of the glass-based article is substantially free of CaO.

According to aspect (57), the glass-based article of any of aspect (33) to the preceding aspect is provided, wherein the composition at the center of the glass-based article comprises: greater than or equal to 0 mol % to less than or equal to 3 mol % SrO.

According to aspect (58), the glass-based article of any of aspect (33) to the preceding aspect is provided, wherein the composition at the center of the glass-based article is substantially free of SrO.

According to aspect (59), the glass-based article of any of aspect (33) to the preceding aspect is provided, wherein the composition at the center of the glass-based article comprises: greater than or equal to 0 mol % to less than or equal to 5 mol % ZnO.

According to aspect (60), the glass-based article of any of aspect (33) to the preceding aspect is provided, wherein the composition at the center of the glass-based article is substantially free of ZnO.

According to aspect (61), the glass-based article of any of aspect (33) to the preceding aspect is provided, wherein a glass having the same composition and microstructure as the composition at the center of the glass-based article has a K$_{IC}$ fracture toughness greater than or equal to 0.8 MPa·m$^{0.5}$ to less than or equal to 1.0 MPa·m$^{0.5}$.

According to aspect (62), the glass-based article of any of aspect (33) to the preceding aspect is provided, wherein a glass having the same composition and microstructure as the composition at the center of the glass-based article has a Young's modulus greater than or equal to 80 GPa to less than or equal to 100 GPa.

According to aspect (63), a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover substrate disposed over the display, wherein at least a portion of at least one of the housing and the cover substrate comprises the glass-based article of any of aspect (33) to the preceding aspect.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

DETAILED DESCRIPTION

Reference will now be made in detail to lithium aluminosilicate glasses according to various embodiments. Lithium aluminosilicate glasses have good ion exchangeability, and chemical strengthening processes have been used to achieve high strength and high toughness properties in lithium aluminosilicate glasses. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved. The stress profiles achieved through chemical strengthening may have a variety of shapes that increase the drop performance, strength, toughness, and other attributes of the glass-based articles.

Therefore, lithium aluminosilicate glasses with good physical properties, chemical durability, and ion exchangeability have drawn attention for use as cover glass. In particular, lithium containing aluminosilicate glasses, which have higher fracture toughness and higher Young's modulus, are provided herein. Through different ion exchange processes, greater central tension (CT), depth of compression (DOC), and high compressive stress (CS) can be achieved. However, the addition of lithium in the aluminosilicate glass may reduce the melting point, softening point, or liquidus viscosity of the glass.

Figure 6:
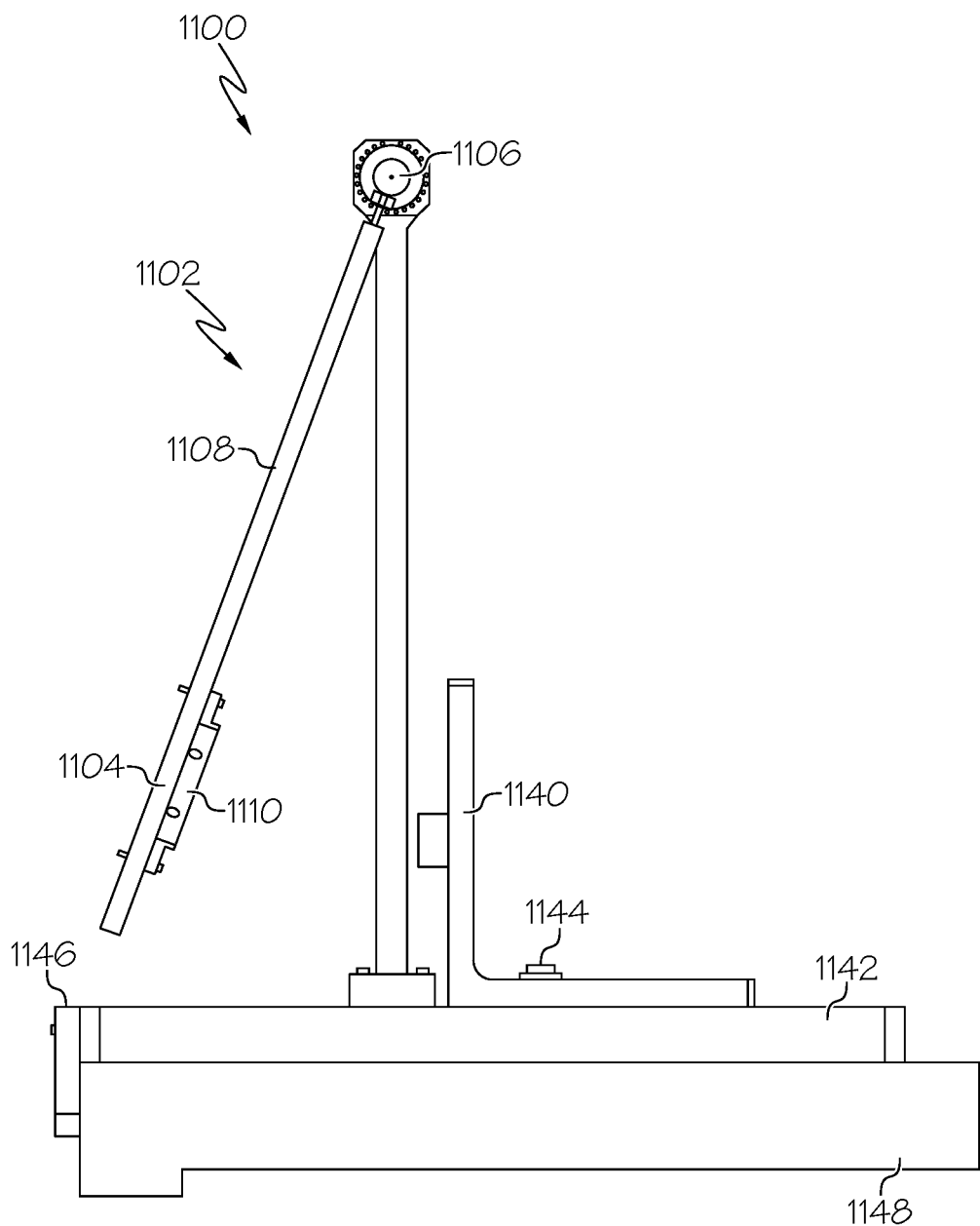
FIG. 6 is a schematic view of an apparatus that introduces damage to a glass article via impact with an impacting object.

The term "retained strength," as used herein, refers to the strength of a glass article after damage introduction by an impact force when the article is bent to impart tensile tress. Damage is introduced according to the method described in U.S. Patent Publication No. 2019/0072469 A1, which is incorporated herein by reference. For example, an apparatus for impact testing a glass article is shown as reference number 1100 in FIG. 6. The apparatus 1100 includes a pendulum 1102 including a bob 1104 attached to a pivot 1106. The term "bob" on a pendulum, as used herein, is a weight suspended from and connected to a pivot by an arm. Thus, the bob 1104 shown is connected to the pivot 1106 by an arm 1108. The bob 1104 includes a base 1110 for receiving a glass article, and the glass article is affixed to the base. The apparatus 1100 further includes an impacting object 1140 positioned such that when the bob 1104 is released from a position at an angle greater than zero from the equilibrium position, the surface of the bob 1104 contacts the impacting object 1140. The impacting object includes an abrasive sheet having an abrasive surface to be placed in contact with the outer surface of the glass article. The abrasive sheet may comprise sandpaper, which may have a grit size in the range of 30 grit to 400 grit, or 100 grit to 300 grit, for example 180 grit.

For purposes of this disclosure, the impacting object was in the form of a 6 mm diameter disk of 80 grit, 120 grit, or 180 grit sandpaper affixed to the apparatus. A glass article having a thickness of approximately 600 μm was affixed to the bob. For each impact, a fresh sandpaper disk was used. Damage on the glass article was done at approximately 500 N impact force by pulling the swing of the arm of the apparatus to approximately a 90° angle. Approximately 10 samples of each glass article were impacted.

Twelve hours or more after the damage introduction, the glass articles were fractured in four-point bending (4PB). The damaged glass article was placed on support rods (support span) with the damaged site on the bottom (i.e., on the tension side) and between the load roads (loading span). For purposes of this disclosure, the loading span was 18 mm and the support span was 36 mm. The radius of curvature of load and support rods was 3.2 mm. Loading was done at a constant displacement rate of 5 mm/min using a screw-driven testing machine (Instron®, Norwood, Massachusetts, USA) until failure of glass. 4PB tests were done at a temperature of 22° C.±2° C. and at a RH (relative humidity) of 50%±5%.

The applied fracture stress (or the applied stress to failure) $\sigma_{app}$ in four-point bending (4PB) was calculated from the equation, $$\sigma_{app} = \frac{1}{(1-v^2)} \frac{3P(L-a)}{2bh^2} \qquad (1)$$

where, P is the maximum load to failure, L (=36 mm) is the distance between support rods (support span), a (=18 mm) is the distance between the loading rods (loading span), b is the width of the glass plate, h is the thickness of the glass plate and v is the Poisson's Ratio of the glass composition. The term $(1/(1-v^2))$ in Eq. (1) considers the stiffening effect of a plate. In four-point bending, stress is constant under the loading span and thus, the damaged site is under mode I uniaxial tensile stress loading. The stressing rate of the 4-point bend testing for the specimens was estimated to be between 15 to 17 MPa per sec. The retained strength of the glass composition is the highest applied fracture stress at which failure does not occur.

The term "softening point," as used herein, refers to the temperature at which the viscosity of the glass composition is $1 \times 10^{7.6}$ poise. The softening point was determined using the parallel plate viscosity method of ASTM C1351M-96 (2012).

The term "annealing point," as used herein, refers to the temperature at which the viscosity of the glass composition is $1 \times 10^{13}$ poise.

The term "strain point," as used herein, refers to the temperature at which the viscosity of the glass composition is $1 \times 10^{14.68}$ poise.

The term "CTE," as used herein, refers to the average coefficient of thermal expansion of the glass composition over a temperature range from about 20° C. to about 300° C., unless otherwise specified.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. Components of the alkali aluminosilicate glass composition according to embodiments are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits.

As utilized herein, a "glass substrate" refers to a glass piece that has not been ion exchanged. Similarly, a "glass article" refers to a glass piece that has been ion exchanged and is formed by subjecting a glass substrate to an ion exchange process. A "glass-based substrate" and a "glass-based article" are defined accordingly and include glass substrates and glass articles as well as substrates and articles that are made wholly or partly of glass, such as glass substrates that include a surface coating. While glass substrates and glass articles may generally be referred to herein for the sake of convenience, the descriptions of glass substrates and glass articles should be understood to apply equally to glass-based substrates and glass-based articles.

Disclosed herein are MgO and $ZrO_2$ containing lithium aluminosilicate glass compositions that exhibit a high fracture toughness ($K_{IC}$) and a high Young's modulus. In embodiments, the glass compositions are characterized by a $K_{IC}$ fracture toughness value of at least 0.8 MPa·m$^{0.5}$. In embodiments, the glass compositions are characterized by a Young's modulus of at least 80 GPa. These properties are achieved at least in part due to the inclusion of MgO, $ZrO_2$, and $Al_2O_3$ in the glass.

While scratch performance is desirable, drop performance is the leading attribute for glass-based articles incorporated into mobile electronic devices. Fracture toughness and stress at depth are critical for improved drop performance on rough surfaces. For this reason, maximizing the amount of stress that can be provided in a glass before reaching frangibility limit increases the stress at depth and the rough surface drop performance. The fracture toughness is known to control the frangibility limit and increasing the fracture toughness increases the frangibility limit. The glass compositions disclosed herein have a high fracture toughness and are capable of achieving high compressive stress levels while remaining non-frangible. These characteristics of the glass compositions enable the development of improved stress profiles designed to address particular failure modes. This capability allows the ion exchanged glass-based articles produced from the glass compositions described herein to be customized with different stress profiles to address particular failure modes of concern.

Glass compositions with high fracture toughness and Young's modulus are especially suited for the formation of chemically strengthened glass-based articles due to the ability to store a high amount of strain energy, imparted by the chemical strengthening, without becoming frangible. The stored strain energy ($\Sigma_0$) of commercial cover glasses and mobile device housings is managed to achieve the desired resistance to fracture while avoiding the ejection of small particles upon fracture. The size (x) of a fragment that may be formed upon fracture is determined primarily by the fracture toughness ($K_{IC}$) of the glass utilized to form the chemically strengthened glass-based article and the maximum central tension (CT) of the glass-based article as demonstrated by the following equation:

$$x = 2(1+v)\left(\frac{K_{IC}}{CT}\right)^2 \left(\frac{t}{t-2DOC}\right)$$

where t is the thickness of the glass-based article, v is the Poisson's ratio of the glass utilized to form the chemically strengthened glass-based article, and DOC is the depth of compression of the glass-based article. The above equation indicates that glass compositions with higher fracture toughness produce chemically strengthened glass-based articles with reduced size of ejected small particles.

The number of fragments produced upon the fracture of a glass-based article is proportional to the stored strain energy ($\Sigma_0$) of the article according to the below equation:

$$\Sigma_0 = \frac{1-v}{2E} \int_{-z}^{z} (2\sigma^2) dz$$

where E is the Young's modulus of the glass utilized to form the glass-based article, σ is the stress as a function of depth, and z=0.5 t-DOC such that −z to z defines the central tension region of the glass-based article. As demonstrated by the above stored strain energy equation, glass compositions with higher Young's modulus values have lower store strain energies for any given stress profile, reducing the number of fragments produced when a glass-based article formed from the glass composition fractures. When the fragment size and stored strain energy equations are considered together, it is clear that glass compositions with a high fracture toughness in combination with high a Young's modulus allow for the production of glass-based articles with high maximum central tensions while avoiding frangibility.

The compositions described herein are selected to achieve high fracture toughness and Young's modulus values while also maintaining a desired degree of manufacturability. The compositions include high amounts of $Al_2O_3$ and $Li_2O$ to produce a desired fracture toughness while maintaining compatibility with desired manufacturing limits. The drop performance of ion exchanged glass-based articles formed from the glass compositions described herein is improved by increasing the amount of compressive stress imparted to the glass articles. The glass compositions described herein provide improved ion exchange performance, as evidenced by an increased central tension capability and increased ion exchange speed.

In the glass compositions described herein, $SiO_2$ is the largest constituent and, as such, $SiO_2$ is the primary constituent of the glass network formed from the glass composition. Pure $SiO_2$ has a relatively low CTE. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. Additionally, the inclusion of too much $SiO_2$ in the glass composition decreases the capacity of the glass to produce compressive stress through ion exchange. If the concentration of $SiO_2$ in the glass composition is too low the chemical durability of the glass may be diminished, and the glass may be susceptible to surface damage during post-forming treatments. In embodiments, the glass composition generally comprises $SiO_2$ in an amount of from greater than or equal to 45 mol % to less than or equal to 70 mol %, such as greater than or equal to 50 mol % to less than or equal to 65 mol %, greater than or equal to 51 mol % to less than or equal to 65 mol %, greater than or equal to 51 mol % to less than or equal to 64 mol %, greater than or equal to 52 mol % to less than or equal to 63 mol %, greater than or equal to 53 mol % to less than or equal to 62 mol %, greater than or equal to 54 mol % to less than or equal to 61 mol %, greater than or equal to 55 mol % to less than or equal to 60 mol %, greater than or equal to 56 mol % to less than or equal to 59 mol %, greater than or equal to 57 mol % to less than or equal to 58 mol %, and all ranges and sub-ranges between the foregoing values.

The glass compositions include $Al_2O_3$. $Al_2O_3$ may serve as a glass network former, similar to $SiO_2$. $Al_2O_3$ may increase the liquidus viscosity of a glass melt formed from the glass composition due to its tetrahedral coordination, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes. An increase in the content of $Al_2O_3$ relative to the total content of alkali and alkaline earth oxides in the glass composition generally improves the durability of the glass. When the concentration of alkali oxides ($R_2O$) is close or greater than the amount of $Al_2O_3$ in the glass composition, predominantly all or all aluminum in the glass is present in tetrahedral coordination state with the alkali ions acting as a charge-compensator. This charge balancing allows for a high diffusivity of alkali ions, increasing the rate of ion exchange. The inclusion of $Al_2O_3$ in the glass compositions enables the high fracture toughness values described herein. In embodiments, the glass composition comprises $Al_2O_3$ in a concentration of from greater than or equal to 11.5 mol % to less than or equal to 25 mol %, such as greater than or equal to 12.0 mol % to less than or equal to 19 mol %, greater than or equal to 12 mol % to less than or equal to 24.5 mol %, greater than or equal to 12.5 mol % to less than or equal to 24 mol %, greater than or equal to 13 mol % to less than or equal to 23.5 mol %, greater than or equal to 13.5 mol % to less than or equal to 23 mol %, greater than or equal to 14 mol % to less than or equal to 22.5 mol %, greater than or equal to 14.5 mol % to less than or equal to 22 mol %, greater than or equal to 15 mol % to less than or equal to 21.5 mol %, greater than or equal to 15.5 mol % to less than or equal to 21 mol %, greater than or equal to 16 mol % to less than or equal to 20.5 mol %, greater than or equal to 16.5 mol % to less than or equal to 20 mol %, greater than or equal to 17 mol % to less than or equal to 19.5 mol %, greater than or equal to 17.5 mol % to less than or equal to 19 mol %, greater than or equal to 18 mol % to less than or equal to 18.5 mol %, and all ranges and sub-ranges between the foregoing values.

In embodiments, the glass composition comprises $Al_2O_3$ in a concentration of from greater than or equal to 4 mol % to less than or equal to 25 mol %, such as greater than or equal to 5 mol % to less than or equal to 24 mol %, greater than or equal to 6 mol % to less than or equal to 23 mol %, greater than or equal to 7 mol % to less than or equal to 22 mol %, greater than or equal to 8 mol % to less than or equal to 21 mol %, greater than or equal to 9 mol % to less than or equal to 20 mol %, greater than or equal to 10 mol % to less than or equal to 19 mol %, greater than or equal to 11 mol % to less than or equal to 18 mol %, greater than or equal to 12 mol % to less than or equal to 17 mol %, greater than or equal to 13 mol % to less than or equal to 16 mol %, greater than or equal to 14 mol % to less than or equal to 15 mol %, and all ranges and sub-ranges between the foregoing values.

The glass compositions include $Li_2O$. The inclusion of $Li_2O$ in the glass composition allows for better control of an ion exchange process and further reduces the softening point, liquidus temperature, and melting temperature of the glass, thereby increasing the manufacturability of the glass. The presence of $Li_2O$ in the glass compositions also allows the formation of a stress profile with a parabolic shape. The $Li_2O$ in the glass compositions also enables the high fracture toughness values described herein. The inclusion of too much $Li_2O$ in the glass composition increase the coefficient of thermal expansion and lowers the chemical durability of the glass. If insufficient much $Li_2O$ is included in the glass composition the ability of the glass to be ion exchanged is undesirably reduced and the desired stress profile may not be achieved. In embodiments, the glass composition comprises $Li_2O$ in an amount from greater than or equal to 2 mol % to less than or equal to 20 mol %, such as greater than or equal to 3 mol % to less than or equal to 12 mol %, greater than or equal to 4 mol % to less than or equal to 19 mol %, greater than or equal to 5 mol % to less than or equal to 18 mol %, greater than or equal to 6 mol % to less than or equal to 17 mol %, greater than or equal to 7 mol % to less than or equal to 16 mol %, greater than or equal to 8 mol % to less than or equal to 15 mol %, greater than or equal to 9 mol % to less than or equal to 14 mol %, greater than or equal to 10 mol % to less than or equal to 13 mol %, greater than or equal to 11 mol % to less than or equal to 12 mol %, and all ranges and sub-ranges between the foregoing values.

In embodiments, the glass composition comprises $Li_2O$ in an amount from greater than or equal to 5 mol % to less than or equal to 20 mol %, such as from greater than or equal to 6 mol % to less than or equal to 19 mol %, greater than or equal to 7 mol % to less than or equal to 18 mol %, greater than or equal to 8 mol % to less than or equal to 17 mol %, greater than or equal to 9 mol % to less than or equal to 16 mol %, greater than or equal to 10 mol % to less than or equal to 15 mol %, greater than or equal to 11 mol % to less than or equal to 14 mol %, greater than or equal to 12 mol % to less than or equal to 13 mol %, and all ranges and sub-ranges between the foregoing values.

The glass compositions described herein include $Na_2O$. $Na_2O$ aids in the ion-exchangeability of the glass composition, and improves the formability, and thereby manufacturability, of the glass composition. However, if too much $Na_2O$ is added to the glass composition, the CTE may be too low. Additionally, if too much $Na_2O$ is included in the glass relative to the amount of $Li_2O$ the ability of the glass to achieve a deep depth of compression when ion exchanged may be reduced. In embodiments, the glass composition comprises $Na_2O$ in an amount from greater than 0 mol % to less than or equal to 10 mol %, such as greater than or equal to 0.25 mol % to less than or equal to 6 mol %, greater than or equal to 0.5 mol % to less than or equal to 9 mol %, greater than or equal to 1 mol % to less than or equal to 8 mol %, greater than or equal to 2 mol % to less than or equal to 7 mol %, greater than or equal to 3 mol % to less than or equal to 6 mol %, greater than or equal to 4 mol % to less than or equal to 5 mol %, and all ranges and sub-ranges between the foregoing values.

In embodiments the glass composition comprises $Na_2O$ in an amount from greater than or equal to 0.1 mol % to less than or equal to 10 mol %, such as greater than or equal to 0.25 mol % to less than or equal to 6 mol %, greater than or equal to 0.5 mol % to less than or equal to 9 mol %, greater than or equal to 1 mol % to less than or equal to 8 mol %, greater than or equal to 2 mol % to less than or equal to 7 mol %, greater than or equal to 3 mol % to less than or equal to 6 mol %, greater than or equal to 4 mol % to less than or equal to 5 mol %, and all ranges and sub-ranges between the foregoing values.

The glass compositions described herein include MgO. MgO may lower the liquidus viscosity of a glass and improve the melting behavior, which enhances the formability and manufacturability of the glass. The inclusion of MgO in a glass composition may also improve the strain point and the Young's modulus of the glass composition. However, if too much MgO is added to the glass composition, the liquidus viscosity may be too low for compatibility with desirable forming techniques. The addition of too much MgO may also increase the density and the CTE of the glass composition to undesirable levels and reduce the alkali ion mobility in the glass reducing the effectiveness of ion exchange treatments. The inclusion of MgO in the glass composition also helps to achieve the high fracture toughness values described herein due to the high field strength of MgO. In embodiments, the glass composition comprises MgO in an amount from greater than or equal to 9 mol % to less than or equal to 19 mol %, such as greater than or equal to 10 mol % to less than or equal to 19 mol %, greater than or equal to 11 mol % to less than or equal to 18 mol %, greater than or equal to 12 mol % to less than or equal to 17 mol %, greater than or equal to 13 mol % to less than or equal to 16 mol %, greater than or equal to 14 mol % to less than or equal to 15 mol %, and all ranges and sub-ranges between the foregoing values.

In embodiments, the glass composition comprises MgO in an amount from greater than or equal to 6 mol % to less than or equal to 25 mol %, such as from greater than or equal to 7 mol % to less than or equal to 24 mol %, greater than or equal to 8 mol % to less than or equal to 23 mol %, greater than or equal to 9 mol % to less than or equal to 22 mol %, greater than or equal to 10 mol % to less than or equal to 21 mol %, greater than or equal to 11 mol % to less than or equal to 20 mol %, greater than or equal to 12 mol % to less than or equal to 19 mol %, greater than or equal to 13 mol % to less than or equal to 18 mol %, greater than or equal to 14 mol % to less than or equal to 17 mol %, greater than or equal to 15 mol % to less than or equal to 16 mol %, and all ranges and sub-ranges between the foregoing values.

The glass compositions described herein include $ZrO_2$. The inclusion of $ZrO_2$ in the glass increases the fracture toughness and allows the glass compositions to achieve the high fracture toughness values described herein due to its high field strength. Including $ZrO_2$ in the glass composition also improves the chemical durability of the glass. The inclusion of too much $ZrO_2$ in the glass composition may result in the formation of undesirable zirconia inclusions in the glass, due at least in part to the low solubility of $ZrO_2$ in the glass. Additionally, there are cost and supply constraints that make including too much $ZrO_2$ in the glass composition undesirable. In embodiments, the glass composition comprises $ZrO_2$ in an amount from greater than 0 mol % to less than or equal to 4 mol %, such as greater than or equal to 0.25 mol % to less than or equal to 2 mol %, greater than or equal to 0.25 mol % to less than or equal to 3.5 mol %, greater than or equal to 0.5 mol % to less than or equal to 3 mol %, greater than or equal to 1 mol % to less than or equal to 2.5 mol %, greater than or equal to 1.5 mol % to less than or equal to 2 mol %, and all ranges and sub-ranges between the foregoing values.

In embodiments, the glass composition comprises $ZrO_2$ in an amount from greater than or equal to 0.1 mol % to less than or equal to 4 mol %, such as greater than or equal to 0.25 mol % to less than or equal to 2 mol %, greater than or equal to 0.25 mol % to less than or equal to 3.5 mol %, greater than or equal to 0.5 mol % to less than or equal to 3 mol %, greater than or equal to 1 mol % to less than or equal to 2.5 mol %, greater than or equal to 1.5 mol % to less than or equal to 2 mol %, and all ranges and sub-ranges between the foregoing values.

The glass compositions described herein may include $TiO_2$. The inclusion of too much $TiO_2$ in the glass composition may result in the glass being susceptible to devitrification and/or exhibiting an undesirable coloration as well as undesirably changing the liquidus. The inclusion of some $TiO_2$ in the glass composition may prevents the undesirable discoloration of the glass upon exposure to intense ultraviolet light, such as during post-processing treatments. In embodiments, the glass composition comprises $TiO_2$ in an amount from greater than or equal to 0 mol % to less than or equal to 0.5 mol %, such as greater than or equal to 0.1 mol % to less than or equal to 0.4 mol %, greater than or equal to 0.2 mol % to less than or equal to 0.3 mol %, and all ranges and sub-ranges between the foregoing values. In embodiments, the glass composition is substantially free or free of $TiO_2$. As used herein, the term "substantially free" means that the component is not purposefully added as a component of the batch material even though the component may be present in the final glass composition in very small amounts as a contaminant, such as less than 0.1 mol %.

The glass compositions described herein may include $B_2O_3$. The inclusion of $B_2O_3$ increases the fracture toughness of the glass, and thereby the damage resistance. In particular, the glass compositions include boron in the trigonal configuration which increases the Knoop scratch threshold and fracture toughness of the glasses. If too much $B_2O_3$ is included in the composition the amount of compressive stress imparted in an ion exchange process may be reduced and volatility at free surfaces during manufacturing may increase to undesirable levels. The inclusion of $B_2O_3$ in the glass composition also decreases the melting viscosity and helps to suppress the breakdown of zircon. In embodiments, the glass composition comprises $B_2O_3$ in an amount from greater than or equal to 0 mol % to less than or equal to 10 mol %, such as greater than or equal to 0 mol % to less than or equal to 6 mol %, greater than or equal to 0.5 mol % to less than or equal to 9 mol %, greater than or equal to 1 mol % to less than or equal to 8 mol %, greater than or equal to 2 mol % to less than or equal to 7 mol %, greater than or equal to 3 mol % to less than or equal to 6 mol %, greater than or equal to 4 mol % to less than or equal to 5 mol %, and all ranges and sub-ranges between the foregoing values. In embodiments, the glass composition is substantially free or free of $B_2O_3$.

The glass compositions described herein may include $P_2O_5$. The inclusion of $P_2O_5$ increases the diffusivity of ions in the glass, increasing the speed of the ion exchange process. If too much $P_2O_5$ is included in the composition the amount of compressive stress imparted in an ion exchange process may be reduced and volatility at free surfaces during manufacturing may increase to undesirable levels. In embodiments, the glass composition comprises $P_2O_5$ in an amount from greater than or equal to 0 mol % to less than or equal to 4 mol %, such as greater than or equal to 0 mol % to less than or equal to 3 mol %, greater than or equal to 0.5 mol % to less than or equal to 3.5 mol %, greater than or equal to 1 mol % to less than or equal to 3 mol %, greater than or equal to 1.5 mol % to less than or equal to 2.5 mol %, greater than or equal to 0.5 mol % to less than or equal to 2 mol %, and all ranges and sub-ranges between the foregoing values. In embodiments, the glass composition is substantially free or free of $P_2O_5$.

The glass compositions described herein may include $K_2O$. The inclusion of $K_2O$ in the glass composition increases the potassium diffusivity in the glass, enabling a deeper depth of a compressive stress spike ($DOL_{SP}$) to be achieved in a shorter amount of ion exchange time. If too much $K_2O$ is included in the composition the amount of compressive stress imparted during an ion-exchange process may be reduced. In embodiments, the glass composition comprises $K_2O$ in an amount from greater than or equal to 0 mol % to less than or equal to 3 mol %, such as greater than or equal to 0.25 mol % to less than or equal to 2.5 mol %, greater than or equal to 0.5 mol % to less than or equal to 2 mol %, greater than or equal to 1 mol % to less than or equal to 1.5 mol %, and all ranges and sub-ranges between the foregoing values. In embodiments, the glass composition is substantially free or free of $K_2O$.

In embodiments, the glass composition comprises $K_2O$ in an amount from greater than or equal to 0.1 mol % to less than or equal to 5 mol %, such as greater than or equal to 0.5 mol % to less than or equal to 4.5 mol %, greater than or equal to 1 mol % to less than or equal to 4 mol %, greater than or equal to 1.5 mol % to less than or equal to 3.5 mol %, greater than or equal to 2 mol % to less than or equal to 3 mol %, and all ranges and sub-ranges between the foregoing values.

The glass compositions described herein may include CaO. CaO may lower the liquidus viscosity of a glass, which may enhance the formability, the strain point, and the Young's modulus. However, if too much CaO is added to the glass composition, the density and the CTE of the glass composition may increase to undesirable levels and the ion exchangeability of the glass may be undesirably impeded due to decreased alkali ion mobility. In embodiments, the glass composition comprises CaO in an amount from greater than or equal to 0 mol % to less than or equal to 3 mol %, such as greater than or equal to 0.25 mol % to less than or equal to 2.5 mol %, greater than or equal to 0.5 mol % to less than or equal to 2 mol %, greater than or equal to 1 mol % to less than or equal to 1.5 mol %, and all ranges and sub-ranges between the foregoing values. In embodiments, the glass composition is substantially free or free of CaO.

The glass compositions described herein may include SrO. SrO may lower the viscosity of a glass, which may enhance the formability, the strain point, and the Young's modulus. However, if too much SrO is added to the glass composition, the density and the CTE of the glass composition may increase to undesirable levels and the ion exchangeability of the glass may be undesirably impeded. In embodiments, the glass composition comprises SrO in an amount from greater than or equal to 0 mol % to less than or equal to 3 mol %, such as greater than or equal to 0.25 mol % to less than or equal to 2.5 mol %, greater than or equal to 0.5 mol % to less than or equal to 2 mol %, greater than or equal to 1 mol % to less than or equal to 1.5 mol %, and all ranges and sub-ranges between the foregoing values. In embodiments, the glass composition is substantially free or free of SrO.

The glass compositions described herein may include ZnO. ZnO may lower the liquidus viscosity of a glass, which may enhance the formability, the strain point, and the Young's modulus. However, if too much ZnO is added to the glass composition, the density and the CTE of the glass composition may increase to undesirable levels. The inclusion of ZnO in the glass composition also provides protection against UV induced discoloration. In embodiments, the glass composition comprises ZnO in an amount from greater than or equal to 0 mol % to less than or equal to 5 mol %, such as greater than or equal to 0.5 mol % to less than or equal to 5 mol %, greater than or equal to 1 mol % to less than or equal to 4 mol %, greater than or equal to 2 mol % to less than or equal to 3 mol %, and all ranges and sub-ranges between the foregoing values. In embodiments, the glass composition is substantially free or free of ZnO.

The glass compositions may include one or more fining agents. In embodiments, the fining agent may include, for example, $SnO_2$. In embodiments, $SnO_2$ may be present in the glass composition in an amount less than or equal to 0.2 mol %, such as from greater than or equal to 0 mol % to less than or equal to 0.2 mol %, greater than or equal to 0 mol % to less than or equal to 0.1 mol %, greater than or equal to 0.1 mol % to less than or equal to 0.2 mol %, and all ranges and sub-ranges between the foregoing values. In some embodiments, the glass composition may be substantially free or free of $SnO_2$. In embodiments, the glass composition may be substantially free of one or both of arsenic and antimony. In other embodiments, the glass composition may be free of one or both of arsenic and antimony.

In embodiments, the glass composition may comprise $SnO_2$ in an amount from greater than or equal to 0.05 mol % to less than or equal to 0.5 mol %, such as greater than or equal to 0.1 mol % to less than or equal to 0.45 mol %, greater than or equal to 0.15 mol % to less than or equal to 0.40 mol %, greater than or equal to 0.2 mol % to less than or equal to 0.35 mol %, greater than or equal to 0.25 mol % to less than or equal to 0.3 mol %, and all ranges and sub-ranges between the foregoing values.

The glass compositions described herein may be formed primarily from $SiO_2$, $Al_2O_3$, $Li_2O$, $Na_2O$, MgO, and $ZrO_2$. In embodiments, the glass compositions are substantially free or free of components other than $SiO_2$, $Al_2O_3$, $Li_2O$, $Na_2O$, MgO, $ZrO_2$, $P_2O_5$, $B_2O_3$, and $TiO_2$. In embodiments, the glass compositions are substantially free or free of components other than $SiO_2$, $Al_2O_3$, $Li_2O$, $Na_2O$, MgO, $ZrO_2$, $P_2O_5$, $B_2O_3$, $TiO_2$, and a fining agent.

In embodiments, the glass composition may be substantially free or free of $Fe_2O_3$. Iron is often present in raw materials utilized to form glass compositions, and as a result may be detectable in the glass compositions described herein even when not actively added to the glass batch.

In embodiments, the glass composition may be substantially free or free of at least one of $Ta_2O_5$, $HfO_2$, $La_2O_3$, and $Y_2O_3$. In embodiments, the glass composition may be substantially free or free of $Ta_2O_5$, $HfO_2$, $La_2O_3$, and $Y_2O_3$. While these components may increase the fracture toughness of the glass when included, there are cost and supply constraints that make using these components undesirable for commercial purposes. Stated differently, the ability of the glass compositions described herein to achieve high fracture toughness values within the inclusion of $Ta_2O_5$, $HfO_2$, $La_2O_3$, and $Y_2O_3$ provides a cost and manufacturability advantage.

Physical properties of the glass compositions as disclosed above will now be discussed.

Glass compositions according to embodiments have a high fracture toughness. Without wishing to be bound by any particular theory, the high fracture toughness may impart improved drop performance to the glass compositions. The high fracture toughness of the glass compositions described herein increases the resistance of the glasses to damage and allows a higher degree of stress to be imparted to the glass through ion exchange, as characterized by central tension, without becoming frangible. As utilized herein, the fracture toughness refers to the Kw value as measured by the chevron notched short bar method unless otherwise noted. The chevron notched short bar (CNSB) method utilized to measure the Kw value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Additionally, the Kw values are measured on non-strengthened glass samples, such as measuring the Kw value prior to ion exchanging a glass-based substrate to form a glass-based article. The Kw values discussed herein are reported in $MPa \cdot m^{0.5}$, unless otherwise noted.

In embodiments, the glass compositions exhibit a Kw value of greater than or equal to $0.8\ MPa \cdot m^{0.5}$, such as greater than or equal to $0.80\ MPa \cdot m^{0.5}$, greater than or equal to $0.81\ MPa \cdot m^{0.5}$, greater than or equal to $0.82\ MPa \cdot m^{0.5}$, greater than or equal to $0.83\ MPa \cdot m^{0.5}$, greater than or equal to $0.84\ MPa \cdot m^{0.5}$, greater than or equal to $0.85\ MPa \cdot m^{0.5}$, greater than or equal to $0.86\ MPa \cdot m^{0.5}$, greater than or equal to $0.87\ MPa \cdot m^{0.5}$, greater than or equal to $0.88\ MPa \cdot m^{0.5}$, greater than or equal to $0.89\ MPa \cdot m^{0.5}$, greater than or equal to $0.90\ MPa \cdot m^{0.5}$, greater than or equal to $0.91\ MPa \cdot m^{0.5}$, greater than or equal to $0.92\ MPa \cdot m^{0.5}$, greater than or equal to $0.93\ MPa \cdot m^{0.5}$, greater than or equal to $0.94\ MPa \cdot m^{0.5}$, greater than or equal to $0.95\ MPa \cdot m^{0.5}$, or more. In embodiments, the glass compositions exhibit a Kw value of from greater than or equal to $0.8\ MPa \cdot m^{0.5}$ to less than or equal to $1.0\ MPa \cdot m^{0.5}$, such as greater than or equal to $0.83\ MPa \cdot m^{0.5}$ to less than or equal to $0.95\ MPa \cdot m^{0.5}$, greater than or equal to $0.81\ MPa \cdot m^{0.5}$ to less than or equal to $0.99\ MPa \cdot m^{0.5}$, greater than or equal to $0.82\ MPa \cdot m^{0.5}$ to less than or equal to $0.98\ MPa \cdot m^{0.5}$, greater than or equal to $0.83\ MPa \cdot m^{0.5}$ to less than or equal to $0.97\ MPa \cdot m$", greater than or equal to $0.84\ MPa \cdot m^{0.5}$ to less than or equal to $0.96\ MPa \cdot m^{0.5}$, greater than or equal to $0.85\ MPa \cdot m^{0.5}$ to less than or equal to $0.95\ MPa \cdot m^{0.5}$, greater than or equal to $0.86\ MPa \cdot m^{0.5}$ to less than or equal to $0.94\ MPa \cdot m^{0.5}$, greater than or equal to $0.87\ MPa \cdot m^{0.5}$ to less than or equal to $0.93\ MPa \cdot m$", greater than or equal to $0.88\ MPa \cdot m^{0.5}$ to less than or equal to $0.92\ MPa \cdot m^{0.5}$, greater than or equal to $0.89\ MPa \cdot m^{0.5}$ to less than or equal to $0.91\ MPa \cdot m^{0.5}$, greater than or equal to $0.82\ MPa \cdot m^{0.5}$ to less than or equal to $0.90\ MPa \cdot m^{0.5}$, and all ranges and sub-ranges between the foregoing values.

Glass compositions according to embodiments have a high Young's modulus. The high Young's modulus values reduce the stored strain energy present in the glass after ion exchange. As utilized herein, the Young's modulus (E) refers to the value measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." In embodiments, the glass compositions have a Young's modulus of greater than or equal to 80 GPa, such as greater than or equal to 81 GPa, greater than or equal to 82 GPa, greater than or equal to 83 GPa, greater than or equal to 84 GPa, greater than or equal to 85 GPa, greater than or equal to 86 GPa, greater than or equal to 87 GPa, greater than or equal to 88 GPa, greater than or equal to 89 GPa, greater than or equal to 90 GPa, greater than or equal to 91 GPa, greater than or equal to 92 GPa, greater than or equal to 93 GPa, greater than or equal to 94 GPa, greater than or equal to 95 GPa, greater than or equal to 96 GPa, greater than or equal to 97 GPa, greater than or equal to 98 GPa, or more. In embodiments, the glass compositions have a Young's modulus of greater than or equal to 80 GPa to less than or equal to 100 GPa, such as greater than or equal to 83 GPa to less than or equal to 99 GPa, greater than or equal to 81 GPa to less than or equal to 99 GPa, greater than or equal to 82 GPa to less than or equal to 98 GPa, greater than or equal to 83 GPa to less than or equal to 97 GPa, greater than or equal to 84 GPa to less than or equal to 96 GPa, greater than or equal to 85 GPa to less than or equal to 95 GPa, greater than or equal to 86 GPa to less than or equal to 94 GPa, greater than or equal to 87 GPa to less than or equal to 93 GPa, greater than or equal to 88 GPa to less than or equal to 92 GPa, greater than or equal to 89 GPa to less than or equal to 91 GPa, greater than or equal to 90 GPa to less than or equal to 100 GPa, and all ranges and sub-ranges between the foregoing values.

The glass compositions described herein have liquidus viscosities that are compatible with manufacturing processes that are especially suitable for forming thin glass sheets. For example, the glass compositions are compatible with traditional forming methods such as float, rolling, or pressing processes. Embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based article. The fusion of the glass films produces a fusion line within the glass-based substrate, and this fusion line allows glass-based substrates that were fusion formed to be identified without additional knowledge of the manufacturing history. The fusion draw method offers the advantage that, because the two glass films flowing over the channel fuse together, neither of the outside surfaces of the resulting glass-based article comes in contact with any part of the apparatus. Thus, the surface properties of the fusion drawn glass-based article are not affected by such contact.

The glass compositions described herein may be selected to have liquidus viscosities that are compatible with fusion draw processes. Thus, the glass compositions described herein are compatible with existing forming methods, increasing the manufacturability of glass-based articles formed from the glass compositions. As used herein, the term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. Unless specified otherwise, a liquidus viscosity value disclosed in this application is determined by the following method. First, the liquidus temperature of the glass is measured in accordance with ASTM C829-81 (2015), titled "Standard Practice for Measurement of Liquidus Temperature of Glass by the Gradient Furnace Method." Next, the viscosity of the glass at the liquidus temperature is measured in accordance with ASTM C965-96 (2012), titled "Standard Practice for Measuring Viscosity of Glass Above the Softening Point". Unless otherwise specified, the liquidus viscosity and temperature of a glass composition or article is measured before the composition or article is subjected to any ion-exchange process or any other strengthening process. In particular, the liquidus viscosity and temperature of a glass composition or article is measured before the composition or article is exposed to an ion-exchange solution, for example before being immersed in an ion-exchange solution.

In one or more embodiments, the glass compositions described herein may form glass-based articles that exhibit an amorphous microstructure and may be substantially free of crystals or crystallites. In other words, the glass-based articles formed from the glass compositions described herein may exclude glass-ceramic materials.

Figure 1:
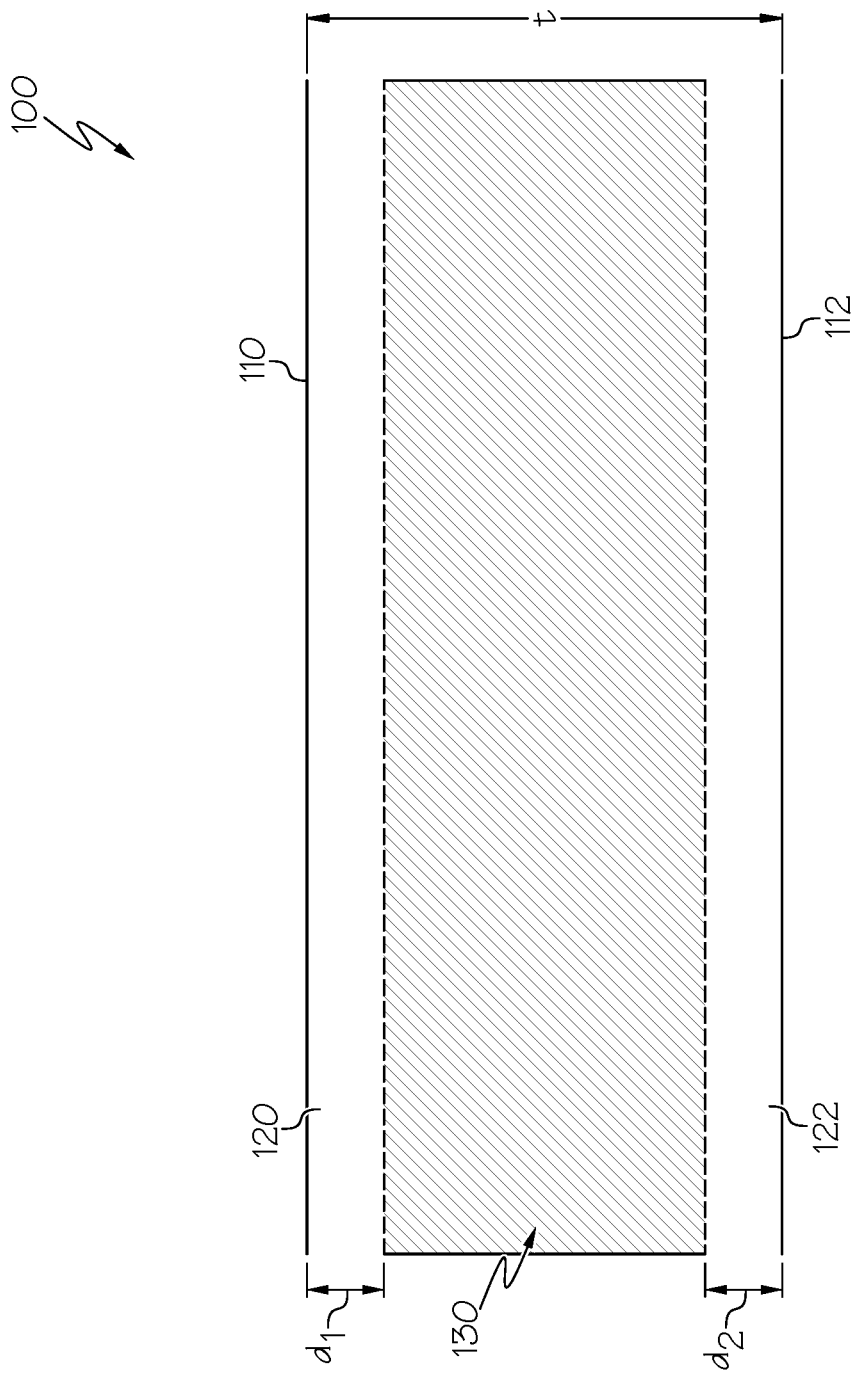
FIG. 1 schematically depicts a cross section of a glass-based article having compressive stress regions according to embodiments described and disclosed herein.

As mentioned above, in embodiments, the glass compositions described herein can be strengthened, such as by ion exchange, making a glass-based article that is damage resistant for applications such as, but not limited to, display covers. With reference to FIG. 1, a glass-based article is depicted that has a first region under compressive stress (e.g., first and second compressive layers 120, 122 in FIG. 1) extending from the surface to a depth of compression (DOC) of the glass-based article and a second region (e.g., central region 130 in FIG. 1) under a tensile stress or central tension (CT) extending from the DOC into the central or interior region of the glass-based article. As used herein, DOC refers to the depth at which the stress within the glass-based article changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) has a maximum at or near the surface of the glass-based article, and the CS varies with distance d from the surface according to a function. Referring again to FIG. 1, a first segment 120 extends from first surface 110 to a depth $d_1$ and a second segment 122 extends from second surface 112 to a depth $d_2$. Together, these segments define a compression or CS of glass-based article 100. The surface compressive stress (CS) may be measured using a scattered light polariscope (SCALP) technique or a refractive near field (RNF) technique known in the art. CS values provided herein are measured using a SCALP technique, unless otherwise specified. As used herein, the term "CSk" refers to the compressive stress at the depth of the knee (i.e., transition point) as measured by RNF.

In embodiments, the CS of the glass-based articles is from greater than or equal to 400 MPa to less than or equal to 2000 MPa, such as greater than or equal to 500 MPa to less than or equal to 1900 MPa, greater than or equal to 600 MPa to less than or equal to 1800 MPa, greater than or equal to 700 MPa to less than or equal to 1700 MPa, greater than or equal to 800 MPa to less than or equal to 1300 MPa, greater than or equal to 900 MPa to less than or equal to 1200 MPa, greater than or equal to 1000 MPa to less than or equal to 1100 MPa, and all ranges and sub-ranges between the foregoing values.

In embodiments, $Na^+$ and $K^+$ ions are exchanged into the glass-based article and the $Na^+$ ions diffuse to a deeper depth into the glass-based article than the $K^+$ ions. The depth of penetration of $K^+$ ions ("Potassium DOL") is distinguished from DOC because it represents the depth of potassium penetration as a result of an ion exchange process. The Potassium DOL is typically less than the DOC for the articles described herein. Potassium DOL may be measured using a surface stress meter such as the commercially available FSM-6000 surface stress meter, manufactured by Orihara Industrial Co., Ltd. (Japan), which relies on accurate measurement of the stress optical coefficient (SOC). The potassium DOL may define a depth of a compressive stress spike ($DOL_{SP}$), where a stress profile transitions from a steep spike region to a less-steep deep region. The deep region extends from the bottom of the spike to the depth of compression. The $DOL_{SP}$ of the glass-based articles may be from greater than or equal to 3 μm to less than or equal to 10 μm, such as greater than or equal to 4 μm to less than or equal to 9 μm, greater than or equal to 5 μm to less than or equal to 8 μm, greater than or equal to 6 μm to less than or equal to 7 μm, and all ranges and sub-ranges between the foregoing values.

The compressive stress of both major surfaces (110, 112 in FIG. 1) is balanced by stored tension in the central region (130) of the glass-based article. The surface compressive stress (CS), maximum central tension (CT) and DOC values may be measured using a scattered light polariscope (SCALP) technique known in the art. The SCALP method also may be used to determine the stress profile of the glass-based articles.

The measurement of a maximum CT value is an indicator of the total amount of stress stored in the strengthened articles. For this reason, the ability to achieve higher CT values correlates to the ability to achieve higher degrees of strengthening and increased performance. In embodiments, the glass-based article may have a maximum CT of from greater than or equal to 30 MPa to less than or equal to 300 MPa, such as greater than or equal to 40 MPa to less than or equal to 290 MPa, greater than or equal to 50 MPa to less than or equal to 280 MPa, greater than or equal to 60 MPa to less than or equal to 270 MPa, greater than or equal to 70 MPa to less than or equal to 260 MPa, greater than or equal to 80 MPa to less than or equal to 250 MPa, greater than or equal to 90 MPa to less than or equal to 240 MPa, greater than or equal to 100 MPa to less than or equal to 230 MPa, greater than or equal to 110 MPa to less than or equal to 220 MPa, greater than or equal to 120 MPa to less than or equal to 210 MPa, greater than or equal to 130 MPa to less than or equal to 200 MPa, greater than or equal to 140 MPa to less than or equal to 190 MPa, greater than or equal to 150 MPa to less than or equal to 180 MPa, greater than or equal to 16 MPa to less than or equal to 170 MPa, and all ranges and sub-ranges between the foregoing values.

The high fracture toughness values of the glass compositions described herein also may enable improved performance. The frangibility limit of the glass-based articles produced utilizing the glass compositions described herein is dependent at least in part on the fracture toughness. For this reason, the high fracture toughness of the glass compositions described herein allows for a large amount of stored strain energy to be imparted to the glass-based articles formed therefrom without becoming frangible. The increased amount of stored strain energy that may then be included in the glass-based articles allows the glass-based articles to exhibit increased fracture resistance, which may be observed through the drop performance of the glass-based articles. The relationship between the frangibility limit and the fracture toughness is described in U.S. Patent Application Pub. No. 2020/0079689 A1, titled "Glass-based Articles with Improved Fracture Resistance," published Mar. 12, 2020, the entirety of which is incorporated herein by reference. The relationship between the fracture toughness and drop performance is described in U.S. Patent Application Pub. No. 2019/0369672 A1, titled "Glass with Improved Drop Performance," published Dec. 5, 2019, the entirety of which is incorporated herein by reference.

As noted above, DOC is measured using a scattered light polariscope (SCALP) technique known in the art. The DOC is provided in some embodiments herein as a portion of the thickness (t) of the glass-based article. In embodiments, the glass-based articles may have a depth of compression (DOC) from greater than or equal to 0.15 t to less than or equal to 0.25 t, such as from greater than or equal to 0.16 t to less than or equal to 0.24 t, from greater than or equal to 0.17 t to less than or equal to 0.23 t, from greater than or equal to 0.18 t to less than or equal to 0.22 t, from greater than or equal to 0.19 t to less than or equal to 0.20 t, from greater than or equal to 0.15 t to less than or equal to 0.21 t, and all ranges and sub-ranges between the foregoing values. The high DOC values produced when the glass compositions described herein are ion exchanged provide improved resistance to fracture, especially for situations where deep flaws may be introduced. For example, the deep DOC provides improved resistance to fracture when dropped on rough surfaces.

Thickness (t) of glass-based article 100 is measured between surface 110 and surface 112. In embodiments, the thickness of glass-based article 100 may be in a range from greater than or equal to 0.1 mm to less than or equal to 4 mm, such as greater than or equal to 0.2 mm to less than or equal to 2 mm, greater than or equal to 0.2 mm to less than or equal to 3.5 mm, greater than or equal to 0.3 mm to less than or equal to 3 mm, greater than or equal to 0.4 mm to less than or equal to 2.5 mm, greater than or equal to 0.5 mm to less than or equal to 2 mm, greater than or equal to 0.6 mm to less than or equal to 1.5 mm, greater than or equal to 0.7 mm to less than or equal to 1 mm, greater than or equal to 0.2 mm to less than or equal to 2 mm, and all ranges and sub-ranges between the foregoing values. The glass substrate utilized to form the glass-based article may have the same thickness as the thickness desired for the glass-based article.

Compressive stress layers may be formed in the glass by exposing the glass to an ion exchange medium. In embodiments, the ion exchange medium may be molten salt bath, such as a bath containing a molten nitrate salt. In embodiments, the ion exchange medium may be a molten salt bath including $KNO_3$, $NaNO_3$, or combinations thereof. In embodiments, other sodium and potassium salts may be used in the ion exchange medium, such as, for example sodium or potassium nitrites, phosphates, or sulfates. In embodiments, the ion exchange medium may include lithium salts, such as $LiNO_3$. The ion exchange medium may additionally include additives commonly included when ion exchanging glass, such as silicic acid. The ion exchange process is applied to a glass-based substrate to form a glass-based article that includes a compressive stress layer extending from a surface of the glass-based article to a depth of compression and a central tension region. The glass-based substrate utilized in the ion exchange process may include any of the glass compositions described herein.

In embodiments, the ion exchange medium comprises $NaNO_3$. The sodium in the ion exchange medium exchanges with lithium ions in the glass to produce a compressive stress. In embodiments, the ion exchange medium may include $NaNO_3$ in an amount of less than or equal to 95 wt %, such as less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less. In embodiments, the ion exchange medium may include $NaNO_3$ in an amount of greater than or equal to 5 wt %, such as greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, or more. In embodiments, the ion exchange medium may include $NaNO_3$ in an amount of greater than or equal to 0 wt % to less than or equal to 100 wt %, such as greater than or equal to 10 wt % to less than or equal to 90 wt %, greater than or equal to 20 wt % to less than or equal to 80 wt %, greater than or equal to 30 wt % to less than or equal to 70 wt %, greater than or equal to 40 wt % to less than or equal to 60 wt %, greater than or equal to 50 wt % to less than or equal to 90 wt %, and all ranges and sub-ranges between the foregoing values. In embodiments, the molten ion exchange bath includes 100 wt % $NaNO_3$.

In embodiments, the ion exchange medium comprises $KNO_3$. In embodiments, the ion exchange medium may include $KNO_3$ in an amount of less than or equal to 95 wt %, such as less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less. In embodiments, the ion exchange medium may include $KNO_3$ in an amount of greater than or equal to 5 wt %, such as greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, or more. In embodiments, the ion exchange medium may include $KNO_3$ in an amount of greater than or equal to 0 wt % to less than or equal to 100 wt %, such as greater than or equal to 10 wt % to less than or equal to 90 wt %, greater than or equal to 20 wt % to less than or equal to 80 wt %, greater than or equal to 30 wt % to less than or equal to 70 wt %, greater than or equal to 40 wt % to less than or equal to 60 wt %, greater than or equal to 50 wt % to less than or equal to 90 wt %, and all ranges and sub-ranges between the foregoing values. In embodiments, the molten ion exchange bath includes 100 wt % $KNO_3$.

The ion exchange medium may include a mixture of sodium and potassium. In embodiments, the ion exchange medium is a mixture of potassium and sodium, such as a molten salt bath that includes both $NaNO_3$ and $KNO_3$. In embodiments, the ion exchange medium may include any combination $NaNO_3$ and $KNO_3$ in the amounts described above, such as a molten salt bath containing 80 wt % $NaNO_3$ and 20 wt % $KNO_3$.

The glass composition may be exposed to the ion exchange medium by dipping a glass substrate made from the glass composition into a bath of the ion exchange medium, spraying the ion exchange medium onto a glass substrate made from the glass composition, or otherwise physically applying the ion exchange medium to a glass substrate made from the glass composition to form the ion exchanged glass-based article. Upon exposure to the glass composition, the ion exchange medium may, according to embodiments, be at a temperature from greater than or equal to 400° C. to less than or equal to 550° C., such as greater than or equal to 410° C. to less than or equal to 540° C., greater than or equal to 420° C. to less than or equal to 530° C., greater than or equal to 430° C. to less than or equal to 520° C., greater than or equal to 440° C. to less than or equal to 510° C., greater than or equal to 450° C. to less than or equal to 500° C., greater than or equal to 460° C. to less than or equal to 490° C., greater than or equal to 470° C. to less than or equal to 480° C., and all ranges and sub-ranges between the foregoing values. In embodiments, the glass composition may be exposed to the ion exchange medium for a duration from greater than or equal to 0.5 hours to less than or equal to 48 hours, such as greater than or equal to 1 hour to less than or equal to 24 hours, greater than or equal to 2 hours to less than or equal to 12 hours, greater than or equal to 1 hours to less than or equal to 18 hours, greater than or equal to 2 hours to less than or equal to 16 hours, greater than or equal to 7 hours to less than or equal to 12 hours, and all ranges and sub-ranges between the foregoing values.

The ion exchange process may include a second ion exchange treatment. In embodiments, the second ion exchange treatment may include ion exchanging the glass-based article in a second molten salt bath. The second ion exchange treatment may utilize any of the ion exchange mediums described herein. In embodiments, the second ion exchange treatment utilizes a second molten salt bath that includes $KNO_3$.

The ion exchange process may be performed in an ion exchange medium under processing conditions that provide an improved compressive stress profile as disclosed, for example, in U.S. Patent Application Publication No. 2016/0102011, which is incorporated herein by reference in its entirety. In some embodiments, the ion exchange process may be selected to form a parabolic stress profile in the glass-based articles, such as those stress profiles described in U.S. Patent Application Publication No. 2016/0102014, which is incorporated herein by reference in its entirety.

After an ion exchange process is performed, it should be understood that a composition at the surface of an ion exchanged glass-based article is be different than the composition of the as-formed glass substrate (i.e., the glass substrate before it undergoes an ion exchange process). This results from one type of alkali metal ion in the as-formed glass substrate, such as, for example $Li^+$ or $Na^+$, being replaced with larger alkali metal ions, such as, for example $Na^+$ or $K^+$, respectively. However, the glass composition at or near the center of the depth of the glass-based article will, in embodiments, still have the composition of the as-formed non-ion exchanged glass substrate utilized to form the glass-based article. As utilized herein, the center of the glass-based article refers to any location in the glass-based article that is a distance of at least 0.5 t from every surface thereof, where t is the thickness of the glass-based article.

Figure 2A:
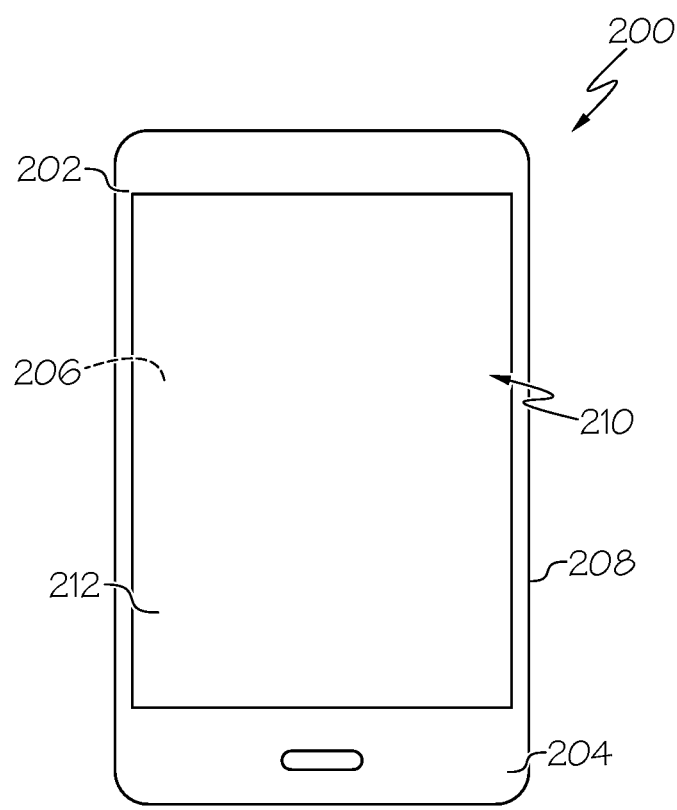
FIG. 2A is a plan view of an exemplary electronic device incorporating any of the glass-based articles disclosed herein.
Figure 2B:
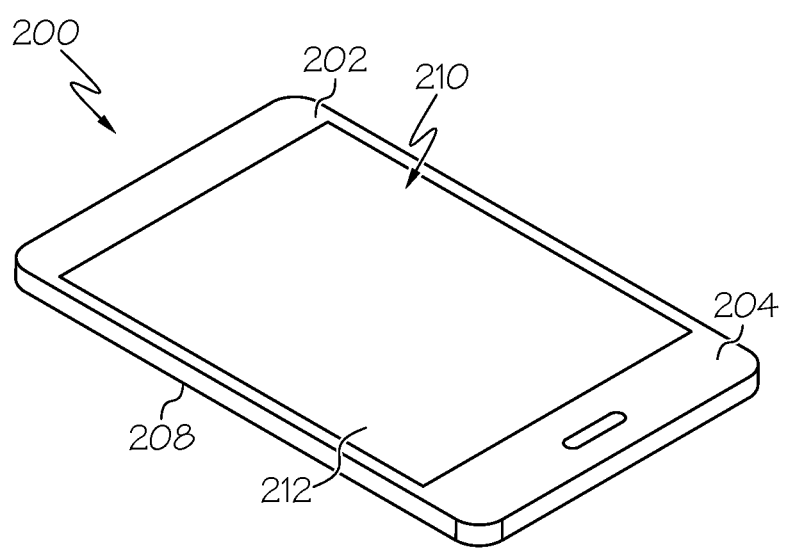
FIG. 2B is a perspective view of the exemplary electronic device of FIG. 2A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover 212 at or over the front surface of the housing such that it is over the display. In embodiments, at least a portion of at least one of the cover 212 and the housing 202 may include any of the glass-based articles described herein.

EXAMPLES

Embodiments will be further clarified by the following examples. It should be understood that these examples are not limiting to the embodiments described above.

Glass compositions were prepared and analyzed. The analyzed glass compositions included the components listed in Table I below and were prepared by conventional glass forming methods. In Table I, all components are in mol %, and the Kw fracture toughness was measured with the chevron notch (CNSB) method described herein. The liquidus temperature and liquidus viscosity were measured according to the method described herein. The Poisson's ratio (v), the Young's modulus (E), and the shear modulus (G) of the glass compositions were measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." The refractive index at 589.3 nm and stress optical coefficient (SOC) of the substrates are also reported in Table I. The refractive index was measured using a PerkinElmer 950 spectrometer. The SOC was measured according to Procedure C (Glass Disc Method) described in ASTM standard C770-16, entitled "Standard Test Method for Measurement of Glass Stress-Optical Coefficient." The density of the glass compositions was determined using the buoyancy method of ASTM C693-93(2013).

Figure 7:
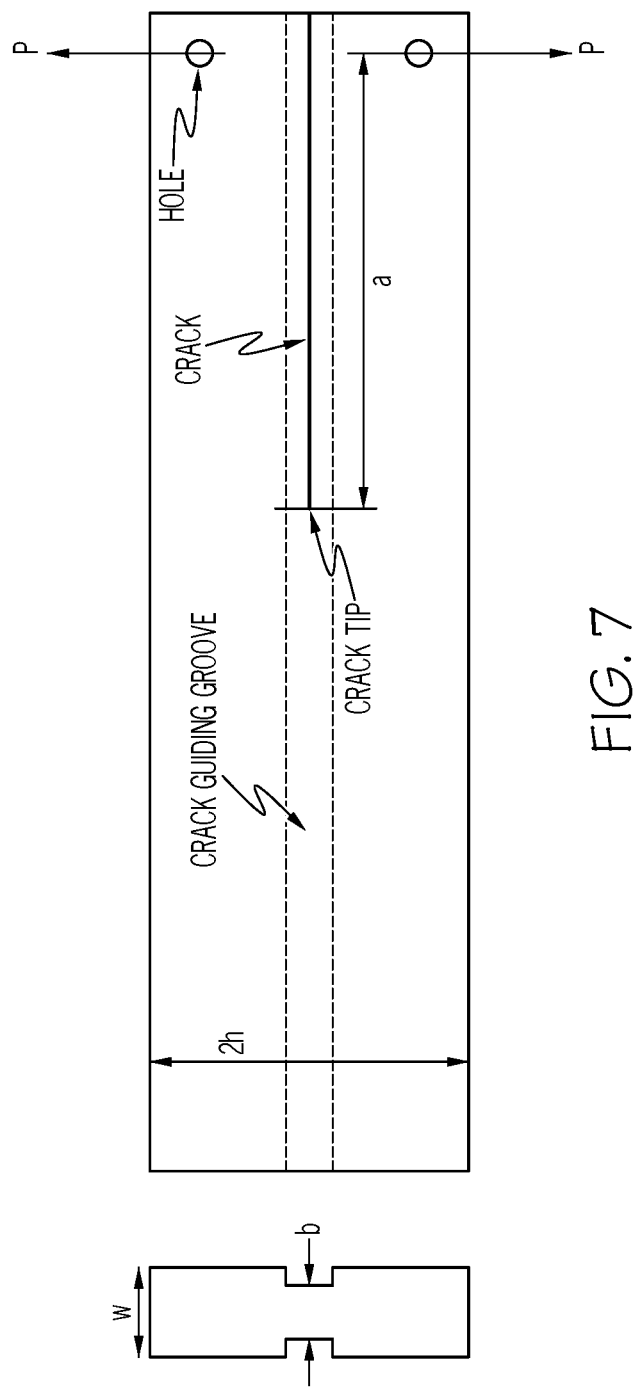
FIG. 7 is a schematic representation of a sample utilized in the double cantilever beam (DCB) procedure to determine the fracture toughness $K_{IC}$ and a cross-section thereof.

Alternative Kw fracture toughness measurements were performed on some samples with the double cantilever beam (DCB) procedure and are also reported in Table I. The DCB specimen geometry is shown in FIG. 7 with parameters being the crack length a, applied load P, cross-sectional dimensions w and 2 h, and the thickness of the crack-guiding groove b. The samples were cut into rectangles of width 2 h=1.25 cm and a thickness ranging from, w=0.3 mm to 1 mm, with the overall length of the sample, which is not a critical dimension, varying from 5 cm to 10 cm. A hole was drilled on both ends with a diamond drill to provide a means of attaching the sample to a sample holder and to the load. A crack "guiding groove" was cut down the length of the sample on both flat faces using a wafer dicing saw with a diamond blade, leaving a "web" of material, approximately half the total plate thickness (dimension b in FIG. 7), with a height of 180 μm corresponding to the blade thickness. The high precision dimensional tolerances of the dicing saw allow for minimal sample-to-sample variation. The dicing saw was also used to cut an initial crack where a=15 mm. As a consequence of this final operation a very thin wedge of material was created near the crack tip (due to the blade curvature) allowing for easier crack initiation in the sample. The samples were mounted in a metal sample holder with a steel wire in the bottom hole of the sample. The samples were also supported on the opposite end to keep the samples level under low loading conditions. A spring in series with a load cell (FUTEK, LSB200) was hooked to the upper hole which was then extended, to gradually apply load, using a rope and a high precision slide. The crack was monitored using a microscope having a 5 μm resolution attached to a digital camera and a computer. The applied stress intensity, $K_P$, was calculated using the following equation:

$$K_P = \left[\frac{P \cdot a}{(w \cdot b)^{0.5} h^{1.5}}\right]\left[3.47 + 2.32\frac{h}{a}\right]$$

For each sample, a crack was first initiated at the tip of the web, and then the starter crack was carefully sub-critically grown until the ratio of dimensions a/h was greater than 1.5 to accurately calculate stress intensity. At this point the crack length, a, was measured and recorded using a traveling microscope with 5 μm resolution. A drop of toluene was then placed into the crack groove and wicked along the length of the groove by capillary forces, pinning the crack from moving until the fracture toughness is reached. The load was then increased until sample fracture occurred, and the critical stress intensity $K_{IC}$ calculated from the failure load and sample dimensions, with $K_{IC}$ being equivalent to Kw due to the measurement method.

TABLE I

| Composition | 1 | 2 | 3 | 4 | 5 | 6 |
|---|---|---|---|---|---|---|
| $SiO_2$ | 62.3 | 64.0 | 62.1 | 60.1 | 59.3 | 55.5 |
| $Al_2O_3$ | 12.5 | 12.9 | 14.8 | 16.8 | 18.5 | 17.5 |
| $B_2O_3$ | 0 | 0 | 0 | 0 | 0 | 5.7 |
| $P_2O_5$ | 1.3 | 0 | 0 | 0 | 0 | 0 |
| $Li_2O$ | 11.2 | 11.1 | 9 | 6.9 | 4.6 | 4.3 |
| $Na_2O$ | 0.8 | 0.8 | 0.6 | 0.5 | 0.3 | 0.3 |
| MgO | 10.2 | 10.2 | 12.6 | 15.1 | 16.6 | 16.1 |
| $ZrO_2$ | 1.7 | 0.8 | 0.7 | 0.5 | 0.4 | 0.4 |
| $SnO_2$ | 0.1 | 0.1 | 0.1 | 0.1 | 0.1 | 0.1 |
| $K_2O$ | 0 | 0 | 0 | 0 | 0 | 0 |
| CaO | 0 | 0 | 0 | 0 | 0 | 0 |
| ZnO | 0 | 0 | 0 | 0 | 0 | 0 |
| Total | 100 | 100 | 100 | 100 | 100 | 100 |
| $R_2O$—$Al_2O_3$ | −0.46 | −1.02 | −5.19 | −9.41 | −13.65 | −12.88 |
| $R_xO$—$Al_2O_3$ | 9.72 | 9.16 | 7.42 | 5.72 | 2.97 | 3.34 |
| Liquidus Temperature (° C.) | >1345 | 1285 | 1300 | 1330 | 1390 | 1300 |
| Primary Devitrification Phase | Zirconia | Spodumene | Spodumene | Spinel | Spinel | Cordierite |
| Liquidus Viscosity (kP) | — | 1.34 | 1.29 | 0.99 | 0.35 | 0.51 |
| Fulchers A | — | — | — | — | — | — |
| Fulchers B | — | — | — | — | — | — |
| Fulchers To | — | — | — | — | — | — |
| CNSB $K_{IC}$ (MPa · m^0.5) | — | 0.86 | 0.89 | 0.87 | 0.95 | 0.94 |
| DCB $K_{IC}$ (MPa · m^0.5) | — | — | — | — | — | — |
| Poisson's Ratio | 0.21 | 0.23 | 0.23 | 0.25 | 0.25 | 0.25 |
| Shear Modulus (GPa) | 34.7 | 36.5 | 37.4 | 38.3 | 39.3 | 36.9 |
| Young's Modulus (GPa) | 83.7 | 89.9 | 92 | 95.4 | 98.25 | 92.3 |
| Anneal Pt. (° C.) | — | — | — | — | — | — |
| Strain Pt. (° C.) | — | — | — | — | — | — |
| Softening Pt. (° C.) | — | — | — | — | — | — |
| Refractive Index | — | 1.53 | 1.54 | 1.54 | 1.55 | 1.54 |

TABLE I-continued

| | | | | | | |
|---|---|---|---|---|---|---|
| Density (g/cm3) | — | — | — | — | — | — |
| CTE (×10−7/° C.) | — | — | — | — | — | — |
| SOC (nm/MPa/cm) | 2.83 | 2.73 | 2.66 | 2.66 | 2.6 | 2.77 |

| Composition | 7 | 8 | 9 | 10 | 11 | 12 |
|---|---|---|---|---|---|---|
| SiO$_2$ | 54.8 | 53.7 | 52.8 | 51.8 | 51.8 | 66.9 |
| Al$_2$O$_3$ | 13.3 | 13.1 | 12.8 | 12.6 | 12.6 | 10.3 |
| B$_2$O$_3$ | 0 | 0 | 0 | 0 | 1.8 | 0 |
| P$_2$O$_5$ | 2.4 | 2.3 | 2.3 | 2.3 | 2.3 | 0 |
| Li$_2$O | 3.8 | 5.6 | 7.3 | 9.0 | 7.2 | 11.1 |
| Na$_2$O | 5.7 | 5.6 | 5.5 | 5.4 | 5.4 | 0.74 |
| MgO | 19.0 | 18.7 | 18.3 | 18.0 | 18.0 | 9.9 |
| ZrO$_2$ | 1.0 | 0.9 | 0.9 | 0.9 | 0.9 | 0.85 |
| SnO$_2$ | 0 | 0 | 0 | 0 | 0 | 0.05 |
| K$_2$O | 0 | 0 | 0 | 0 | 0 | 0 |
| CaO | 0 | 0 | 0 | 0 | 0 | 0.05 |
| ZnO | 0 | 0 | 0 | 0 | 0 | 0 |
| Total | 100 | 100 | 100 | 100 | 100 | 100 |
| R$_2$O—Al$_2$O$_3$ | −3.81 | −1.87 | 0.00 | 1.8 | 0.00 | 1.54 |
| R$_x$O—Al$_2$O$_3$ | 15.24 | 16.82 | 18.35 | 19.82 | 18.02 | 11.49 |
| Liquidus Temperature (° C.) | 1265 | 1245 | 1235 | 1245 | 1195 | 1280 |
| Primary Devitrification Phase | Zirconia | Zirconia Forsterite | Forsterite | Forsterite | Forsterite | Spodumene |
| Liquidus Viscosity (kP) | 0.72 | 0.81 | 0.54 | 0.27 | 0.89 | 1.28 |
| Fulchers A | — | — | — | — | — | −0.349 |
| Fulchers B | — | — | — | — | — | 2367.4 |
| Fulchers To | — | — | — | — | — | 605.7 |
| CNSB K$_{IC}$ (MPa · m^0.5) | 0.83 | 0.88 | 0.84 | 0.85 | 0.83 | 0.78 |
| DCB K$_{IC}$ (MPa · m^0.5) | — | — | — | — | — | — |
| Poisson's Ratio | 0.23 | 0.23 | 0.22 | 0.24 | 0.23 | 0.22 |
| Shear Modulus (GPa) | 36.6 | 36.7 | 36.5 | 36.8 | 36.1 | 36.2 |
| Young's Modulus (GPa) | 90.1 | 90.0 | 89.2 | 91.4 | 85.6 | 88.5 |
| Anneal Pt. (° C.) | — | — | — | — | — | 613.6 |
| Strain Pt. (° C.) | — | — | — | — | — | 570.3 |
| Softening Pt. (° C.) | — | — | — | — | — | — |
| Refractive Index | — | — | — | — | — | — |
| Density (g/cm3) | — | — | — | — | — | — |
| CTE (×10−7/° C.) | — | — | — | — | — | — |
| SOC (nm/MPa/cm) | — | — | — | — | — | — |

| Composition | 13 | 14 | 15 | 16 | 17 | 18 |
|---|---|---|---|---|---|---|
| SiO$_2$ | 69.5 | 72.4 | 67.7 | 70.9 | 72.1 | 61.1 |
| Al$_2$O$_3$ | 8.0 | 5.5 | 4.1 | 7.0 | 6.9 | 14.8 |
| B$_2$O$_3$ | 0 | 0 | 0 | 0 | 0 | 0 |
| P$_2$O$_5$ | 0 | 0 | 0 | 0 | 0 | 0 |
| Li$_2$O | 10.9 | 10.7 | 13.4 | 13.7 | 9.6 | 8.8 |
| Na$_2$O | 0.72 | 0.72 | 0.67 | 0.69 | 0.7 | 1.88 |
| MgO | 9.9 | 9.8 | 13.2 | 6.7 | 9.7 | 12.2 |
| ZrO$_2$ | 0.83 | 0.86 | 0.81 | 0.84 | 0.87 | 0.60 |

TABLE I-continued

| | | | | | | |
|---|---|---|---|---|---|---|
| SnO$_2$ | 0.04 | 0.04 | 0.04 | 0.04 | 0.04 | 0.10 |
| K$_2$O | 0.04 | 0.03 | 0.02 | 0.04 | 0.04 | 0.49 |
| CaO | 0.05 | 0.04 | 0.05 | 0.04 | 0.05 | 0.04 |
| ZnO | 0 | 0 | 0 | 0 | 0 | 0 |
| Total | 100 | 100 | 100 | 100 | 100 | 100 |
| R$_2$O—Al$_2$O$_3$ | 3.66 | 5.95 | 9.99 | 7.43 | 3.44 | −3.63 |
| R$_x$O—Al$_2$O$_3$ | 13.61 | 15.79 | 23.24 | 14.17 | 13.19 | 8.61 |
| Liquidus Temperature (° C.) | 1230 | 1200 | 1185 | 1210 | 1240 | 1250 |
| Primary Devitrification Phase | Zircon | Protoenstatite | Protoenstatite | Spodumene | Zircon | Spinel |
| Liquidus Viscosity (kP) | 3.138 | 4.350 | 0.979 | 2.193 | 5.244 | 3.090 |
| Fulchers A | −1.283 | −2.244 | 0.188 | −1.379 | −1.299 | −2.412 |
| Fulchers B | 4070.3 | 6133.7 | 1684.5 | 4362.7 | 4436.5 | 5681.8 |
| Fulchers T$_0$ | 378.4 | 157.3 | 584 | 285.7 | 356 | 287.3 |
| CNSB KIC (MPa · m^0.5) | 0.817 | 0.84 | 0.837 | 0.809 | 0.82 | 0.854 |
| DCB KIC (MPa · m^0.5) | — | — | — | — | — | — |
| Poisson's Ratio | 0.216 | 0.213 | 0.22 | 0.215 | 0.215 | 0.235 |
| Shear Modulus (GPa) | 35.85 | 35.37 | 36.27 | 35.37 | 35.58 | 37.44 |
| Young's Modulus (GPa) | 87.22 | 85.70 | 88.46 | 85.84 | 86.39 | 92.39 |
| Anneal Pt. (° C.) | 595.9 | 573.3 | 530.2 | 544.8 | 607.5 | 649.4 |
| Strain Pt. (° C.) | 551.9 | 530.1 | 490.7 | 502.3 | 563.9 | 607.2 |
| Softening Pt. (° C.) | — | — | — | — | — | 843 |
| Refractive Index | — | — | — | — | — | — |
| Density (g/cm$^3$) | — | — | — | — | — | 2.501 |
| CTE (×10$^{-7}$/° C.) | — | — | — | — | — | 56.6 |
| SOC (nm/MPa/cm) | 2.827 | 2.827 | 2.649 | 2.784 | 2.841 | 2.702 |

| Composition | 19 | 20 | 21 | 22 | 23 | 24 | 25 |
|---|---|---|---|---|---|---|---|
| SiO$_2$ | 60.5 | 60.0 | 57.9 | 61.0 | 60.5 | 63.9 | 64.0 |
| Al$_2$O$_3$ | 15.1 | 15.5 | 17.6 | 14.5 | 14.3 | 9.8 | 9.3 |
| B$_2$O$_3$ | 0 | 0 | 0 | 0 | 0 | 0 | 0 |
| P$_2$O$_5$ | 0 | 0 | 0 | 0 | 0 | 0 | 0 |
| Li$_2$O | 8.7 | 8.3 | 8.3 | 8.7 | 8.8 | 8.1 | 8.8 |
| Na$_2$O | 1.88 | 1.86 | 1.84 | 1.80 | 1.79 | 1.9 | 1.9 |
| MgO | 12.7 | 13.1 | 13.2 | 11.8 | 13.4 | 14.5 | 13.8 |
| ZrO$_2$ | 0.59 | 0.60 | 0.60 | 1.48 | 0.61 | 1.0 | 1.1 |
| SnO$_2$ | 0.10 | 0.10 | 0.10 | 0.10 | 0.10 | 0.1 | 0.1 |
| K$_2$O | 0.49 | 0.49 | 0.49 | 0.50 | 0.48 | 0.5 | 0.5 |
| CaO | 0.04 | 0.04 | 0.04 | 0.04 | 0.04 | 0.3 | 0.4 |
| ZnO | 0 | 0 | 0 | 0 | 0 | 0 | 0 |
| Total | 100 | 100 | 100 | 100 | 100 | 100 | 100 |
| R$_2$O—Al$_2$O$_3$ | −4.03 | −4.85 | −6.97 | −3.5 | −3.23 | 0.7 | 1.9 |
| R$_x$O—Al$_2$O$_3$ | 8.71 | 8.29 | 6.27 | 8.34 | 10.21 | 15.5 | 16.1 |
| Liquidus Temperature (° C.) | 1290 | >1295 | 1290 | >1345 | 1290 | >1290 | 1270 |
| Primary Devitrification Phase | Spinel | Spinel | Spinel | Zircon | Spinel | Forsterite | Zircon, Forsterite |
| Liquidus Viscosity (kP) | 1.576 | — | 1.344 | — | 1.191 | — | 1.058 |
| Fulchers A | −2.492 | −2.392 | −2.79 | −1.259 | −2.426 | −2.471 | −1.845 |
| Fulchers B | 5680 | 5558.6 | 5867.5 | 3216.8 | 5381 | 5983.4 | 4613.5 |
| Fulchers To | 291.7 | 309.5 | 298.6 | 565.4 | 312 | 220.5 | 322.6 |
| CNSB K$_{IC}$ (MPa · m^0.5) | — | — | — | — | 0.855 | 0.861 | 0.731 |
| DCB K$_{IC}$ (MPa · m^0.5) | — | — | — | — | — | — | — |

TABLE I-continued

| | | | | | | | |
|---|---|---|---|---|---|---|---|
| Poisson's Ratio | 0.229 | 0.234 | 0.235 | 0.232 | 0.235 | 0.224 | 0.222 |
| Shear Modulus (GPa) | 37.30 | 37.72 | 38.20 | 37.72 | 37.78 | 37.10 | 36.61 |
| Young's Modulus (GPa) | 91.70 | 93.15 | 94.32 | 92.94 | 93.29 | 90.81 | 89.57 |
| Anneal Pt. (° C.) | 651.7 | 655.7 | 666.3 | 649 | 641.4 | 625.5 | 609.8 |
| Strain Pt. (° C.) | 609.7 | 613 | 623.9 | 607.3 | 599.3 | 583.2 | 567.8 |
| Softening Pt. (° C.) | 847.9 | — | 857.5 | — | 834.9 | 827 | 804.2 |
| Refractive Index | — | — | — | — | — | — | — |
| Density (g/cm³) | — | — | — | — | — | — | — |
| CTE (×10⁻⁷/° C.) | 55.9 | 55.5 | 54.7 | 56.2 | 56.9 | 60.4 | 59.5 |
| SOC (nm/MPa/cm) | 2.698 | 2.686 | 2.655 | 2.703 | 2.71 | 2.708 | 2.665 |

| Composition | 26 | 27 | 28 | 29 | 30 | 31 |
|---|---|---|---|---|---|---|
| $SiO_2$ | 64.9 | 63.7 | 63.7 | 63.4 | 59.7 | 60.3 |
| $Al_2O_3$ | 8.3 | 9.3 | 9.2 | 9.2 | 14.7 | 14.6 |
| $B_2O_3$ | 0 | 0 | 0 | 0 | 0 | 0 |
| $P_2O_5$ | 0 | 0 | 0 | 0 | 0 | 0 |
| $Li_2O$ | 10.9 | 9.0 | 9.0 | 9.0 | 10.2 | 10.2 |
| $Na_2O$ | 1.9 | 2.0 | 2.1 | 2.2 | 1.8 | 1.7 |
| MgO | 11.4 | 9.2 | 4.8 | 0 | 12.3 | 10.1 |
| $ZrO_2$ | 1.4 | 1.0 | 1.1 | 1.0 | 0.6 | 0.6 |
| $SnO_2$ | 0.1 | 0.1 | 0.1 | 0.1 | 0.1 | 0.1 |
| $K_2O$ | 0.5 | 0.5 | 0.5 | 0.5 | 0.5 | 0.5 |
| CaO | 0.5 | 0.4 | 0.4 | 0.4 | 0 | 2.0 |
| ZnO | 0 | 4.9 | 9.3 | 14.1 | 0 | 0 |
| Total | 100 | 100 | 100 | 100 | 100 | 100 |
| $R_2O-Al_2O_3$ | 5.0 | 2.2 | 2.4 | 2.5 | -2.2 | -2.2 |
| $R_xO-Al_2O_3$ | 16.9 | 16.7 | 16.9 | 17 | 10.1 | 9.9 |
| Liquidus Temperature (° C.) | 1280 | 1300 | 1300 | 1275 | 1240 | 1225 |
| Primary Devitrification Phase | Zircon | Zircon | Zircon | Zircon | Spinel, Spodumene | Spodumene |
| Liquidus Viscosity (kP) | 0.646 | 0.668 | 0.561 | 0.752 | 2.130 | 2.395 |
| Fulchers A | -0.994 | -3.258 | -1.936 | -2.199 | -1.371 | -2.792 |
| Fulchers B | 3153.6 | 7491.7 | 4766.5 | 5312.8 | 3595 | 6226.8 |
| Fulchers To | 451.1 | 68.4 | 282.6 | 228.2 | 475 | 216 |
| CNSB $K_{IC}$ (MPa · m^0.5) | 0.815 | 0.838 | 0.816 | 0.805 | 0.87 | — |
| DCB KIC (MPa · m^0.5) | — | — | — | — | — | — |
| Poisson's Ratio | 0.222 | 0.229 | 0.229 | 0.237 | 0.26 | 0.236 |
| Shear Modulus (GPa) | 36.61 | 36.54 | 36.13 | 35.51 | 37.23 | 37.3 |
| Young's Modulus (GPa) | 89.50 | 89.84 | 88.74 | 87.91 | 93.84 | 92.19 |
| Anneal Pt. (° C.) | 577.2 | 595.6 | 587.4 | 582 | 633.9 | 623.4 |
| Strain Pt. (° C.) | 534.8 | 553.6 | 546.1 | 540.9 | 591.9 | 580.7 |
| Softening Pt. (° C.) | 777.7 | 797 | — | — | 828.9 | 822.1 |
| Refractive Index | — | — | 1.5357 | 1.5367 | 1.5357 | 1.5374 |
| Density (g/cm³) | — | — | 2.504 | 2.502 | 2.504 | 2.513 |
| CTE (×10⁻⁷/° C.) | 65.2 | 58 | 57.8 | 55.7 | 55.2 | 57 |
| SOC (nm/MPa/cm) | 2.722 | 2.889 | 3.037 | 3.215 | 2.684 | 2.672 |

TABLE I-continued

| Composition | 32 | 33 | 34 | 35 | 36 | 37 |
|---|---|---|---|---|---|---|
| $SiO_2$ | 60.3 | 60.4 | 59.1 | 58.8 | 57.3 | 56.7 |
| $Al_2O_3$ | 14.5 | 14.5 | 14.7 | 14.0 | 14.1 | 13.7 |
| $B_2O_3$ | 0 | 0 | 2.0 | 4.0 | 5.6 | 7.5 |
| $P_2O_5$ | 0 | 0 | 0 | 0 | 0 | 0 |
| $Li_2O$ | 10.1 | 10.1 | 8.7 | 8.5 | 8.3 | 7.7 |
| $Na_2O$ | 1.8 | 1.8 | 1.8 | 1.8 | 1.8 | 1.7 |
| MgO | 10.1 | 10 | 12.4 | 11.6 | 11.8 | 11.4 |
| $ZrO_2$ | 0.6 | 0.6 | 0.6 | 0.6 | 0.6 | 0.6 |
| $SnO_2$ | 0.1 | 0.1 | 0.1 | 0.1 | 0.1 | 0.1 |
| $K_2O$ | 0.5 | 0.5 | 0.5 | 0.5 | 0.5 | 0.5 |
| CaO | 0 | 1.0 | 0 | 0 | 0 | 0 |
| ZnO | 2.1 | 1.0 | 0 | 0 | 0 | 0 |
| Total | 100 | 100 | 100 | 100 | 100 | 100 |
| $R_2O$—$Al_2O_3$ | −2.1 | −2.1 | −3.7 | −3.2 | −3.5 | −3.8 |
| $R_xO$—$Al_2O_3$ | 10.1 | 9.9 | 8.7 | 8.4 | 8.3 | 7.6 |
| Liquidus Temperature (° C.) | 1280 | 1245 | — | — | — | — |
| Primary Devitrification Phase | Spinel | Spinel | — | — | — | — |
| Liquidus Viscosity (kP) | 1.239 | 1.685 | — | — | — | — |
| Fulchers A | −2.277 | −2.216 | −2.525 | −2.145 | −2.029 | −2.261 |
| Fulchers B | 5280.8 | 5115.4 | 5859 | 5087.2 | 4740.2 | 5131.4 |
| Fulchers To | 296.6 | 305.1 | 244.4 | 291.5 | 305 | 256.3 |
| CNSB $K_{IC}$ (MPa · m^0.5) | 0.915 | 0.877 | — | — | — | 0.822 |
| DCB $K_{IC}$ (MPa · m^0.5) | — | — | 0.889 | 0.905 | 0.883 | 0.889 |
| Poisson's Ratio | 0.232 | 0.234 | 0.234 | 0.235 | 0.234 | 0.236 |
| Shear Modulus (GPa) | 37.10 | 37.16 | 36.47 | 35.72 | 35.16 | 34.34 |
| Young's Modulus (GPa) | 91.36 | 91.77 | 905 | 88.32 | 86.74 | 84.95 |
| Anneal Pt. (° C.) | 627.2 | 625.3 | 629.7 | 606.2 | 602 | 586.4 |
| Strain Pt. (° C.) | 585.4 | 583.5 | 587.4 | 563.3 | 559.4 | 544.4 |
| Softening Pt. (° C.) | — | 822.1 | 819.8 | 800 | 783.3 | 771.6 |
| Refractive Index | 1.5382 | 1.5379 | 1.5346 | 1.5329 | 1.5311 | 1.5287 |
| Density (g/cm³) | 2.526 | 2.53 | 2.48 | 2.465 | 2.463 | 2.45 |
| CTE (×10⁻⁷/° C.) | 54.9 | 56.1 | 57 | 57.3 | 56.3 | 56.2 |
| SOC (nm/MPa/cm) | 2.735 | 2.719 | 2.762 | 2.824 | 2.902 | 2.943 |

| Composition | 38 | 39 | 40 | 41 | 42 | 43 |
|---|---|---|---|---|---|---|
| $SiO_2$ | 60.3 | 59.2 | 59.0 | 58.5 | 57.7 | 56.3 |
| $Al_2O_3$ | 14.8 | 14.5 | 14.3 | 14.1 | 13.7 | 13.3 |
| $B_2O_3$ | 0 | 0 | 0 | 0 | 0 | 0 |
| $P_2O_5$ | 0 | 0 | 0 | 0 | 0 | 0 |
| $Li_2O$ | 9.1 | 9.0 | 8.9 | 8.8 | 8.6 | 8.5 |
| $Na_2O$ | 2.8 | 3.8 | 4.8 | 5.6 | 7.4 | 9.1 |
| MgO | 11.8 | 12.2 | 11.8 | 11.8 | 11.3 | 11.5 |
| $ZrO_2$ | 0.5 | 0.5 | 0.5 | 0.5 | 0.5 | 0.5 |

TABLE I-continued

|  |  |  |  |  |  |  |
|---|---|---|---|---|---|---|
| SnO$_2$ | 0.1 | 0.1 | 0.1 | 0.1 | 0.1 | 0.1 |
| K$_2$O | 0.5 | 0.5 | 0.5 | 0.5 | 0.5 | 0.5 |
| CaO | 0.1 | 0.1 | 0.1 | 0.1 | 0.1 | 0.1 |
| ZnO | 0 | 0 | 0 | 0 | 0 | 0 |
| Total | 100 | 100 | 100 | 100 | 100 | 100 |
| R$_2$O—Al$_2$O$_3$ | −2.4 | −1.2 | −0.1 | 0.8 | 2.8 | 4.8 |
| R$_x$O—Al$_2$O$_3$ | 9.5 | 11.1 | 11.8 | 12.7 | 14.2 | 16.4 |
| Liquidus Temperature (° C.) | 1230 | 1230 | 1230 | 1245 | 1240 | 1250 |
| Primary Devitrification Phase | Spinel | Forsterite | Forsterite | Forsterite | Forsterite | Forsterite |
| Liquidus Viscosity (kP) | 3.428 | 2.730 | 2.016 | 1.214 | 0.929 | 0.587 |
| Fulchers A | −2.373 | −2.576 | −2.014 | −1.558 | 0.24 | 0.412 |
| Fulchers B | 5676.4 | 6046.5 | 4930.8 | 4103.4 | 1516.2 | 1158.8 |
| Fulchers To | 269.2 | 224.3 | 302.9 | 361.1 | 684.2 | 758.3 |
| CNSB K$_{IC}$ (MPa·m^0.5) | — | — | — | — | — | — |
| DCB KIC (MPa·m^0.5) | 0.904 | 0.899 | 0.889 | 0.875 | 0.834 | 0.823 |
| Poisson's Ratio | 0.229 | 0.232 | 0.228 | 0.229 | 0.227 | 0.229 |
| Shear Modulus (GPa) | 37.23 | 36.89 | 36.61 | 36.41 | 35.85 | 35.51 |
| Young's Modulus (GPa) | 91.50 | 90.81 | 89.98 | 89.50 | 87.98 | 87.28 |
| Anneal Pt. (° C.) | 635.8 | 625 | 613.7 | 603.5 | 592.7 | 572.3 |
| Strain Pt. (° C.) | 593.9 | 582.8 | 572.1 | 562.1 | 550.4 | 531.7 |
| Softening Pt. (° C.) | 824 | 817.2 | 804.9 | 789.5 | 788 | 758.3 |
| Refractive Index | 1.535 | 1.5326 | 1.5331 | 1.5319 | 1.5304 | 1.5318 |
| Density (g/cm$^3$) | 2.505 | 2.51 | 2.507 | 2.509 | 2.513 | 2.522 |
| CTE (×10$^{-7}$/° C.) | 59.9 | 64.1 | 65.4 | 69.6 | 75.7 | 81.8 |
| SOC (nm/MPa/cm) | 2.667 | 2.674 | 2.693 | 2.703 | 2.662 | 2.651 |

| Composition | 44 | 45 | 46 | 47 | 48 | 49 |
|---|---|---|---|---|---|---|
| SiO$_2$ | 58.9 | 57.7 | 56.9 | 57.2 | 54.9 | 53.7 |
| Al$_2$O$_3$ | 14.4 | 13.7 | 13.5 | 13.1 | 12.6 | 11.8 |
| B$_2$O$_3$ | 0 | 0 | 0 | 0 | 0 | 0 |
| P$_2$O$_5$ | 0 | 0 | 0 | 0 | 0 | 0 |
| Li$_2$O | 8.5 | 8.2 | 7.9 | 7.8 | 7.2 | 7.0 |
| Na$_2$O | 2.0 | 1.8 | 1.8 | 1.8 | 1.7 | 1.7 |
| MgO | 15.0 | 17.3 | 18.6 | 18.8 | 22.4 | 24.5 |
| ZrO$_2$ | 0.6 | 0.6 | 0.6 | 0.6 | 0.6 | 0.6 |
| SnO$_2$ | 0.1 | 0.1 | 0.1 | 0.1 | 0.1 | 0.1 |
| K$_2$O | 0.5 | 0.5 | 0.5 | 0.5 | 0.5 | 0.5 |
| CaO | 0.1 | 0.1 | 0.1 | 0.1 | 0.1 | 0.1 |
| ZnO | 0 | 0 | 0 | 0 | 0 | 0 |
| Total | 100 | 100 | 100 | 100 | 100 | 100 |
| R$_2$O—Al$_2$O$_3$ | −3.4 | −3.2 | −3.3 | −3 | −3.2 | −2.6 |
| R$_x$O—Al$_2$O$_3$ | 11.7 | 14.2 | 15.4 | 15.9 | 19.3 | 22 |
| Liquidus Temperature (° C.) | 1270 | 1260 | 1285 | 1305 | 1325 | 1335 |
| Primary Devitrification Phase | Spinel/ Forsterite | Forsterite | Forsterite | Forsterite | Forsterite | Forsterite |
| Liquidus Viscosity (kP) | 1.867 | 1.809 | 1.191 | 0.842 | 0.549 | 0.333 |
| Fulchers A | −2.344 | −2.326 | −1.708 | −1.873 | −2.337 | −0.763 |
| Fulchers B | 5449 | 5297.5 | 4196.6 | 4364.5 | 5102.8 | 2377.8 |
| Fulchers To | 299.6 | 311.2 | 407.8 | 395.4 | 319.9 | 611.4 |
| CNSB K$_{IC}$ (MPa·m^0.5) | — | — | 0.89 | — | — | — |

TABLE I-continued

|  | | | | | | |
|---|---|---|---|---|---|---|
| DCB $K_{IC}$ (MPa·m^0.5) | 0.89 | 0.89 | 0.936 | 0.909 | 0.905 | 0.926 |
| Poisson's Ratio | 0.234 | 0.89 | 0.936 | 0.909 | 0.905 | 0.926 |
| Shear Modulus (GPa) | 37.92 | 38.13 | 38.41 | 38.20 | 38.68 | 39.23 |
| Young's Modulus (GPa) | 93.63 | 94.32 | 95.29 | 94.53 | 95.91 | 96.67 |
| Anneal Pt. (° C.) | 645.7 | 640.8 | 635.3 | 635.3 | 637.5 | 637.4 |
| Strain Pt. (° C.) | 604.1 | 599 | 594.3 | 594.3 | 596.7 | 596.5 |
| Softening Pt. (° C.) | 833.2 | 827.6 | 824 | 812.2 | 809 | 802.8 |
| Refractive Index | 1.5397 | 1.5431 | 1.5423 | 1.5451 | 1.5484 | 1.5551 |
| Density (g/cm³) | 2.522 | 2.527 | 2.552 | 2.548 | 2.571 | 2.59 |
| CTE (×10⁻⁷/° C.) | 52.9 | 54.1 | 53.6 | 55.1 | 55.2 | 56.2 |
| SOC (nm/MPa/cm) | 2.644 | 2.569 | 2.596 | 2.604 | 2.494 | 2.479 |

| Composition | 50 | 51 | 52 | 53 | 54 | 55 |
|---|---|---|---|---|---|---|
| $SiO_2$ | 64.0 | 63.9 | 62.7 | 61.9 | 64.2 | 64.1 |
| $Al_2O_3$ | 7.9 | 8.0 | 8.1 | 8.0 | 8.1 | 8.1 |
| $B_2O_3$ | 3.9 | 4.0 | 3.9 | 4.0 | 3.9 | 3.9 |
| $P_2O_5$ | 0 | 0 | 1.0 | 2.0 | 0 | 0 |
| $Li_2O$ | 10.6 | 10.6 | 10.6 | 10.7 | 10.6 | 10.6 |
| $Na_2O$ | 1.6 | 2.6 | 2.6 | 2.6 | 2.7 | 2.7 |
| MgO | 10.8 | 9.9 | 10.1 | 9.8 | 8.6 | 8.6 |
| $ZrO_2$ | 0 | 0 | 0 | 0 | 0 | 0 |
| $SnO_2$ | 0.1 | 0.1 | 0.1 | 0.1 | 0.1 | 0.1 |
| $K_2O$ | 0.3 | 0.3 | 0.3 | 0.3 | 0.3 | 0.3 |
| CaO | 0.1 | 0.1 | 0.1 | 0.1 | 1.0 | 0.1 |
| ZnO | 0 | 0 | 0 | 0 | 0 | 1.0 |
| Total | 99 | 100 | 100 | 100 | 100 | 100 |
| $R_2O$—$Al_2O_3$ | 4.6 | 5.5 | 5.4 | 5.6 | 5.5 | 5.5 |
| $R_xO$—$Al_2O_3$ | 15.5 | 15.5 | 15.6 | 15.5 | 15.1 | 15.2 |
| Liquidus Temperature (° C.) | 1115 | 1090 | 1055 | 1060 | 1035 | 1055 |
| Primary Devitrification Phase | Protoenstatite | Protoenstatite | Spodumene | Phase Separation | Protoenstatite | Protoenstatite |
| Liquidus Viscosity (kP) | 4.183 | 4.229 | 7.886 | 9.139 | 10.269 | 7.320 |
| Fulchers A | −1.726 | −1.444 | −1.734 | −0.941 | −1.78 | −1.735 |
| Fulchers B | 4820.2 | 4279.8 | 4762.6 | 3268.6 | 4925.7 | 4776.4 |
| Fulchers To | 213.6 | 245.9 | 209.2 | 393.2 | 184.5 | 202 |
| CNSB $K_{IC}$ (MPa·m^0.5) | 0.822 | 0.774 | 0.780 | 0.805 | 0.854 | 0.882 |
| DCB KIC (MPa·m^0.5) | — | — | — | — | — | — |
| Poisson's Ratio | 0.221 | 0.221 | 0.218 | 0.216 | 0.221 | 0.222 |
| Shear Modulus (GPa) | 34.5 | 34.8 | 34.3 | 34 | 34.9 | 34.6 |
| Young's Modulus (GPa) | 84.5 | 85 | 83.7 | 82.7 | 85.2 | 84.6 |
| Anneal Pt. (° C.) | 546 | 533 | 539 | 545 | 529 | 530 |
| Strain Pt. (° C.) | 508 | 498 | 505 | 509 | 495 | 494 |
| Softening Pt. (° C.) | 736.8 | 716.9 | 726.2 | — | 706.1 | 710.1 |
| Refractive Index | 1.5223 | 1.5238 | 1.5211 | 1.5191 | 1.5272 | 1.5263 |

TABLE I-continued

| | | | | | | |
|---|---|---|---|---|---|---|
| Density (g/cm³) | 2.434 | 2.439 | 2.433 | 2.428 | 2.445 | 2.45 |
| CTE (×10⁻⁷/° C.) | 57.7 | 62.1 | 63.6 | 65.2 | 63.7 | 62.8 |
| SOC (nm/MPa/cm) | 2.868 | 2.849 | 2.883 | 2.882 | 2.807 | 2.871 |

| Composition | 56 | 57 | 58 | 59 | 60 | 61 |
|---|---|---|---|---|---|---|
| SiO₂ | 67.6 | 66.7 | 65.7 | 64.7 | 66.0 | 66.6 |
| Al₂O₃ | 5.5 | 5.5 | 5.5 | 5.5 | 5.5 | 5.5 |
| B₂O₃ | 4.0 | 4.1 | 3.9 | 3.9 | 4.0 | 4.0 |
| P₂O₅ | 0 | 0 | 1.0 | 1.9 | 0 | 0 |
| Li₂O | 10.6 | 10.7 | 10.6 | 10.8 | 10.6 | 10.7 |
| Na₂O | 1.7 | 2.6 | 2.6 | 2.6 | 2.6 | 2.6 |
| MgO | 9.5 | 9.3 | 9.5 | 9.4 | 9.4 | 8.5 |
| ZrO₂ | 0 | 0 | 0 | 0 | 0 | 0 |
| SnO₂ | 0.1 | 0.1 | 0.1 | 0.1 | 0.1 | 0.1 |
| K₂O | 0.3 | 0.3 | 0.3 | 0.3 | 0.3 | 0.3 |
| CaO | 0.1 | 0.1 | 0.1 | 0.1 | 1.0 | 0.1 |
| ZnO | 0 | 0 | 0 | 0 | 0 | 1.0 |
| Total | 99 | 99 | 99 | 99 | 100 | 99 |
| R₂O—Al₂O₃ | 7.1 | 8.1 | 8 | 8.2 | 8 | 8.1 |
| RₓO—Al₂O₃ | 16.7 | 17.5 | 17.6 | 17.7 | 18.4 | 17.7 |
| Liquidus Temperature (° C.) | 1090 | 1060 | 1005 | 1150 | 1025 | 1040 |
| Primary Devitrification Phase | Protoenstatite | Protoenstatite | Protoenstatite | Phase Separation | Protoenstatite | Protoenstatite |
| Liquidus Viscosity (kP) | 5.210 | 5.185 | 13.901 | 2.181 | 7.784 | 6.534 |
| Fulchers A | −1.803 | −1.851 | −1.9 | −1.028 | −1.769 | −1.918 |
| Fulchers B | 5116.9 | 5084.9 | 5209.7 | 3458 | 4930.6 | 5163.3 |
| Fulchers To | 163 | 146.4 | 142.9 | 358.1 | 153.9 | 139.4 |
| CNSB $K_{IC}$ (MPa·m^0.5) | 0.837 | 0.838 | 0.815 | 0.771 | 0.797 | 0.811 |
| DCB $K_{IC}$ (MPa·m^0.5) | — | — | — | — | — | — |
| Poisson's Ratio | 0.215 | 0.215 | 0.213 | 0.212 | 0.217 | 0.218 |
| Shear Modulus (GPa) | 34.6 | 34.8 | 34.3 | 33.9 | 34.9 | 34.6 |
| Young's Modulus (GPa) | 84.1 | 84.4 | 83.3 | 82.3 | 85 | 84.4 |
| Anneal Pt. (° C.) | 531 | 521 | 520 | 532 | 517 | 516 |
| Strain Pt. (° C.) | 495 | 487 | 485 | 497 | 483 | 482 |
| Softening Pt. (° C.) | 712.7 | 696.4 | 707.1 | 746.8 | 690.1 | 693.7 |
| Refractive Index | 1.5212 | 1.5225 | 1.5196 | 1.517 | 1.524 | 1.5238 |
| Density (g/cm³) | 2.419 | 2.432 | 2.43 | 2.419 | 2.44 | 2.447 |
| CTE (×10⁻⁷/° C.) | 58.1 | 62.8 | 64.1 | 65 | 63 | 62.5 |
| SOC (nm/MPa/cm) | 2.895 | 2.834 | 2.886 | 2.917 | 2.822 | 2.898 |

| Composition | 62 | 63 | 64 | 65 | 66 | 67 |
|---|---|---|---|---|---|---|
| SiO₂ | 58.8 | 54.8 | 54.2 | 52.7 | 53.9 | 55.2 |
| Al₂O₃ | 13.2 | 13.0 | 12.8 | 12.6 | 13.6 | 13.6 |
| B₂O₃ | 2.2 | 3.9 | 5.7 | 7.5 | 7.4 | 7.6 |
| P₂O₅ | 0 | 0 | 0 | 0 | 0 | 0 |
| Li₂O | 7.8 | 7.6 | 7.5 | 7.4 | 8.5 | 8.5 |
| Na₂O | 1.9 | 1.7 | 1.7 | 1.7 | 1.8 | 1.9 |
| MgO | 14.8 | 17.6 | 16.7 | 16.8 | 13.2 | 11.2 |
| ZrO₂ | 0.6 | 0.6 | 0.6 | 0.6 | 0.4 | 0.4 |

TABLE I-continued

| | | | | | | |
|---|---|---|---|---|---|---|
| SnO$_2$ | 0.1 | 0.1 | 0.1 | 0.1 | 0.1 | 0.1 |
| K$_2$O | 0.5 | 0.5 | 0.5 | 0.5 | 0.5 | 1.0 |
| CaO | 0.1 | 0.1 | 0.1 | 0.1 | 0.6 | 0.6 |
| ZnO | 0 | 0 | 0 | 0 | 0 | 0 |
| Total | 100 | 100 | 100 | 100 | 100 | 100 |
| R$_2$O—Al$_2$O$_3$ | −3.0 | −3.2 | −3.1 | −3.0 | −2.8 | −2.2 |
| R$_x$O—Al$_2$O$_3$ | 11.9 | 14.5 | 13.7 | 13.9 | 11.0 | 9.6 |
| Liquidus Temperature (° C.) | 1235 | 1225 | 1175 | 1130 | 1090 | 1110 |
| Primary Devitrification Phase | Forsterite | Forsterite | Forsterite | Zircon Forsterite | Forsterite | Spodumene |
| Liquidus Viscosity (kP) | 1.950 | 1.552 | 2.304 | 3.625 | 17.686 | 5.331 |
| Fulchers A | −2.386 | −2.045 | −2.24 | −1.894 | −2.445 | −2.093 |
| Fulchers B | 5412 | 4730.7 | 5047.3 | 4487.5 | 5817.9 | 4925.3 |
| Fulchers T0 | 281.5 | 321.5 | 274.1 | 307.1 | 220.7 | 263.7 |
| CNSB KIC (MPa · m^0.5) | — | — | — | — | — | — |
| DCB KIC (MPa · m^0.5) | 0.901 | 0.894 | 0.937 | 0.986 | 0.911 | 0.887 |
| Poisson's Ratio | 0.231 | 0.242 | 0.236 | 0.235 | 0.239 | 0.239 |
| Shear Modulus (GPa) | 37.10 | 37.23 | 36.27 | 36.82 | 34.48 | 34.41 |
| Young's Modulus (GPa) | 91.22 | 92.46 | 89.64 | 90.88 | 85.50 | 85.22 |
| Anneal Pt. (° C.) | 617.5 | 603.6 | 588.6 | 583.2 | 573.3 | 573.2 |
| Strain Pt. (° C.) | 575.1 | 561.5 | 548.4 | 542.3 | 531.8 | 533.2 |
| Softening Pt. (° C.) | 804.4 | — | — | — | 758.3 | 753.1 |
| Refractive Index | 1.5348 | 1.5373 | 1.5382 | 1.5371 | 1.5289 | — |
| Density (g/cm$^3$) | 2.516 | 2.522 | 2.491 | 2.503 | 2.453 | 2.457 |
| CTE (×10$^{-7}$/° C.) | 54.5 | 54 | 57.4 | 56.5 | 53.3 | 55.3 |
| SOC (nm/MPa/cm) | 2.732 | 2.703 | 2.635 | 2.832 | 2.903 | 2.889 |

| Composition | 68 | 69 | 70 | 71 | 72 | 73 |
|---|---|---|---|---|---|---|
| SiO$_2$ | 58.4 | 58.4 | 55.4 | 53.9 | 58.3 | 58.4 |
| Al$_2$O$_3$ | 13.9 | 14.0 | 13.6 | 13.2 | 14.3 | 14.3 |
| B$_2$O$_3$ | 5.7 | 3.8 | 4.0 | 4.0 | 3.8 | 3.9 |
| P$_2$O$_5$ | 0 | 0 | 0 | 0 | 0 | 0 |
| Li$_2$O | 8.6 | 8.6 | 8.4 | 8.2 | 8.5 | 8.7 |
| Na$_2$O | 2.1 | 2.2 | 1.8 | 1.9 | 2.0 | 2.2 |
| MgO | 9.9 | 11.3 | 14.6 | 15.6 | 11.9 | 11.1 |
| ZrO$_2$ | 0.5 | 0.5 | 0.6 | 0.6 | 0.5 | 0.5 |
| SnO$_2$ | 0.1 | 0.1 | 0.1 | 0.1 | 0.1 | 0.1 |
| K$_2$O | 0.5 | 0.5 | 0.5 | 0.5 | 0.5 | 0.5 |
| CaO | 0.3 | 0.5 | 1.0 | 2.0 | 0.2 | 0.4 |
| ZnO | 0 | 0 | 0 | 0 | 0 | 0 |
| Total | 100 | 100 | 100 | 100 | 100 | 100 |
| R$_2$O—Al$_2$O$_3$ | −2.7 | −2.7 | −2.9 | −2.6 | −3.3 | −2.9 |
| R$_x$O—Al$_2$O$_3$ | 7.5 | 9.1 | 12.7 | 15.0 | 8.8 | 8.6 |
| Liquidus Temperature (° C.) | 1135 | 1130 | 1205 | 1195 | 1170 | 1165 |
| Primary Devitrification Phase | Spodumene | Forsterite | — | — | Spodumene | Spodumene |
| Liquidus Viscosity (kP) | 15.186 | 12.384 | 1.771 | 2.467 | 4.352 | 6.725 |
| Fulchers A | −2.48 | −2.635 | −2.065 | −2.117 | −2.414 | −2.515 |
| Fulchers B | 6213.8 | 6234.7 | 4734.5 | 5096.6 | 5589.7 | 6037 |
| Fulchers To | 202.2 | 203.3 | 313.9 | 269.9 | 246.5 | 213.2 |
| CNSB K$_{IC}$ (MPa · m^0.5) | — | — | — | — | — | — |

TABLE I-continued

| | | | | | | |
|---|---|---|---|---|---|---|
| DCB K$_{IC}$ (MPa · m^0.5) | 0.883 | 0.9 | 0.898 | 0.902 | 0.888 | 0.87 |
| Poisson's Ratio | 0.234 | 0.246 | 0.245 | 0.243 | 0.237 | 0.236 |
| Shear Modulus (GPa) | 34.68 | 37.58 | 37.16 | 36.54 | 35.92 | 35.38 |
| Young's Modulus (GPa) | 85.50 | 93.70 | 92.46 | 90.88 | 88.81 | 87.91 |
| Anneal Pt. (° C.) | 585.6 | 595.6 | 598.8 | 594.1 | 601.2 | 597.2 |
| Strain Pt. (° C.) | 544 | 555.1 | 559 | 555 | 557.9 | 554.2 |
| Softening Pt. (° C.) | 775.9 | 787.5 | 772.8 | 773.5 | 794.5 | 799.8 |
| Refractive Index | 1.5292 | 1.5328 | — | 1.5383 | 1.5333 | 1.5322 |
| Density (g/cm$^3$) | 2.457 | 2.489 | 2.516 | 2.584 | 2.477 | 2.486 |
| CTE (×10$^{-7}$/° C.) | 55.3 | 57.1 | 57.7 | 56.7 | 53.6 | 53.7 |
| SOC (nm/MPa/cm) | 2.866 | 2.615 | 2.729 | 2.66 | 2.771 | 2.808 |

| Composition | 74 | 75 | 76 | 77 | 78 |
|---|---|---|---|---|---|
| SiO$_2$ | 59.3 | 59.7 | 60.7 | 57.0 | 56.5 |
| Al$_2$O$_3$ | 14.5 | 14.5 | 14.7 | 14.7 | 14.8 |
| B$_2$O$_3$ | 3.6 | 4.0 | 4.0 | 3.8 | 3.9 |
| P$_2$O$_5$ | 0 | 0 | 0 | 0 | 0 |
| Li$_2$O | 8.3 | 8.5 | 8.6 | 8.7 | 8.6 |
| Na$_2$O | 2.4 | 2.8 | 3.1 | 1.8 | 0.9 |
| MgO | 10.4 | 8.7 | 6.9 | 12.0 | 12.3 |
| ZrO$_2$ | 0.4 | 0.3 | 0.2 | 0.4 | 0.4 |
| SnO$_2$ | 0.1 | 0.1 | 0.1 | 0.1 | 0.1 |
| K$_2$O | 0.5 | 0.5 | 0.5 | 0.9 | 1.8 |
| CaO | 0.6 | 1.0 | 1.3 | 0.6 | 0.6 |
| ZnO | 0 | 0 | 0 | 0 | 0 |
| Total | 100 | 100 | 100 | 100 | 99.9 |
| R$_2$O—Al$_2$O$_3$ | -3.3 | -2.7 | -2.5 | -3.3 | -3.5 |
| R$_x$O—Al$_2$O$_3$ | 7.7 | 7 | 5.7 | 9.3 | 9.4 |
| Liquidus Temperature (° C.) | 1155 | 1115 | 1150 | 1155 | 1145 |
| Primary Devitrification Phase | Spodumene | Spodumene | Spodumene | Spodumene | Spodumene |
| Liquidus Viscosity (kP) | 9.777 | 27.547 | 14.853 | 8.314 | 11.838 |
| Fulchers A | -2.592 | -2.614 | -2.379 | -2.391 | -2.437 |
| Fulchers B | 6384.1 | 6704.9 | 6330.7 | 5916.4 | 6055.2 |
| Fulchers To | 185.1 | 164.5 | 183.6 | 217.5 | 214.9 |
| CNSB KIC (MPa · m^0.5) | — | — | — | — | — |
| DCB KIC (MPa · m^0.5) | 0.875 | 0.866 | 0.837 | 0.881 | 0.875 |
| Poisson's Ratio | 0.235 | 0.231 | 0.229 | 0.231 | 0.23 |
| Shear Modulus (GPa) | 35.23 | 34.82 | 34.27 | 34.89 | 34.54 |
| Young's Modulus (GPa) | 87.01 | 85.64 | 84.12 | 85.91 | 84.95 |
| Anneal Pt. (° C.) | 597.9 | 593.7 | 587.1 | 597.8 | 596.9 |
| Strain Pt. (° C.) | 554.2 | 550 | 542.5 | 554.9 | 553 |
| Softening Pt. (° C.) | 798.5 | 801.5 | 804.9 | 805.5 | 802.1 |
| Refractive Index | 1.5295 | 1.5266 | 1.5245 | 1.5274 | 1.527 |

TABLE I-continued

| | | | | | |
|---|---|---|---|---|---|
| Density (g/cm³) | 2.483 | 2.452 | 2.433 | 2.473 | 2.46 |
| CTE (×10⁻⁷/° C.) | 54.7 | 56.8 | 57 | 55.1 | 55 |
| SOC (nm/MPa/cm) | 2.888 | 2.864 | 2.877 | 2.819 | 2.838 |

| Composition | 79 | 80 | 81 | 82 | 83 | 84 | 85 |
|---|---|---|---|---|---|---|---|
| $SiO_2$ | 60.1 | 60.1 | 58.8 | 55.3 | 57.9 | 58.3 | 54.0 |
| $Al_2O_3$ | 14.7 | 14.2 | 14.1 | 13.6 | 14.0 | 14.1 | 14.0 |
| $B_2O_3$ | 3.7 | 3.7 | 4.7 | 7.3 | 4.5 | 3.9 | 3.6 |
| $P_2O_5$ | 0 | 0 | 0 | 0 | 0 | 0 | 0 |
| $Li_2O$ | 8.7 | 8.8 | 8.7 | 8.6 | 8.5 | 8.4 | 8.6 |
| $Na_2O$ | 3.1 | 2.5 | 2.3 | 1.9 | 2.2 | 2.2 | 1.8 |
| MgO | 7.6 | 9.0 | 9.7 | 11.1 | 11.3 | 11.4 | 15.9 |
| $ZrO_2$ | 0.4 | 0.4 | 0.4 | 0.4 | 0.5 | 0.5 | 0.4 |
| $SnO_2$ | 0.1 | 0.1 | 0.1 | 0.1 | 0.1 | 0.1 | 0.1 |
| $K_2O$ | 0.4 | 0.5 | 0.6 | 1.0 | 0.5 | 0.5 | 0.5 |
| CaO | 1.2 | 0.8 | 0.7 | 0.7 | 0.6 | 0.6 | 1.1 |
| ZnO | 0 | 0 | 0 | 0 | 0 | 0 | 0 |
| Total | 100 | 100 | 100 | 100 | 100 | 100 | 100 |
| $R_2O-Al_2O_3$ | -2.5 | -2.4 | -2.5 | -2.1 | -2.8 | -3 | -2.5 |
| $R_xO-Al_2O_3$ | 6.3 | 7.4 | 7.9 | 9.7 | 9.1 | 9 | 6.3 |
| Liquidus Temperature (° C.) | 1145 | 1165 | 1125 | 1090 | 1120 | 1145 | 1170 |
| Primary Devitrification Phase | Spodumene | Spodumene | Spodumene | Zircon/Spodumene | Zircon | Zircon/Spodumene | Forsterite |
| Liquidus Viscosity (kP) | 6.7 | 3.4 | 5.3 | 3.2 | 4.8 | 3.7 | 0.86 |
| Fulchers A | -2.448 | -1.637 | -1.783 | -1.885 | -2.216 | -2.162 | -1.721 |
| Fulchers B | 5768.4 | 4028.3 | 4332.1 | 4271.6 | 4907.8 | 4849.2 | 3615.1 |
| Fulchers $T_0$ | 226 | 385.5 | 337.8 | 297.1 | 288.2 | 299.2 | 393.2 |
| CNSB $K_{IC}$ (MPa · m^0.5) | 0.836 | 0.82 | 0.804 | 0.828 | 0.804 | 0.834 | 0.871 |
| DCB $K_{IC}$ (MPa · m^0.5) | 0.865 | 0.884 | 0.869 | 0.882 | 0.908 | 0.890 | 0.924 |
| Poisson's Ratio | 0.226 | 0.23 | 0.23 | 0.236 | 0.232 | 0.236 | 0.243 |
| Shear Modulus (GPa) | 34.7 | 35.2 | 34.9 | 34.5 | 35.5 | 35.6 | 37.0 |
| Young's Modulus (GPa) | 85.1 | 86.5 | 85.9 | 85.3 | 87.4 | 88.0 | 91.9 |
| Anneal Pt. (° C.) | 596.2 | 600.4 | 587.5 | 566.9 | 592.8 | 598.7 | 592.7 |
| Strain Pt. (° C.) | 552.3 | 557.4 | 544.7 | 525.3 | 550.9 | 556.9 | 553.2 |
| Softening Pt. (° C.) | 803.3 | 803.9 | 790.4 | 754.3 | 788.1 | 793.7 | 770.7 |
| Refractive Index | 1.5263 | 1.5305 | 1.5277 | 1.5272 | 1.5314 | 1.5304 | 1.542 |
| Density (g/cm³) | — | — | — | — | — | — | — |
| CTE (×10⁻⁷/° C.) | — | — | — | — | — | — | — |
| SOC (nm/MPa/cm) | 2.86 | 2.852 | 2.839 | 2.862 | 2.814 | 2.763 | 2.651 |

Substrates were formed from the compositions of Table I, and subsequently ion exchanged to form example articles. The ion exchange included submerging the substrates into a molten salt bath. The salt bath included 100 wt % $NaNO_3$. In Table II, the length of the ion exchange, bath temperature, and the maximum central tension (CT) of the ion exchanged articles are reported. The maximum central tension (CT) was measured according to the methods described herein.

TABLE II

| Example | | A | B | C | D | E | F |
|---|---|---|---|---|---|---|---|
| Composition | | 1 | 2 | 3 | 4 | 5 | 6 |
| Thickness (mm) | | 0.8 | 0.8 | 0.8 | 0.8 | 0.8 | 0.8 |
| IOX Conditions | Bath Temperature (° C.) | 400 | 450 | 450 | 450 | 450 | 450 |
| | Time (h) | 24 | 16 | 24 | 24 | 24 | 24 |
| Central Tension (MPa) | | 238 | 291 | 264 | 133 | 41 | 43 |

Substrates were formed from the compositions of Table I, and subsequently ion exchanged to form example articles. The ion exchange included submerging the substrates into a molten salt bath. The salt bath included 100 wt % $NaNO_3$ and was at a temperature of 450° C. In Table III, the length of the ion exchange, the weight gain due to the ion exchange treatment, and the maximum central tension (CT), surface compressive stress (CS), and depth of compression (DOC) of the ion exchanged articles are reported.

TABLE III

| Example | Composition | Thickness (μm) | Time (hr) | CT (MPa) | CS (MPa) | DOC (μm) | Weight Gain (%) |
|---|---|---|---|---|---|---|---|
| G | 2 | 810 | 4 | 181.9 | 826.4 | 137 | 1.03 |
| H | 2 | 830 | 7 | 230.8 | 670.8 | 161 | 1.34 |
| I | 2 | 840 | 16 | 291.2 | 544.2 | 173 | 2.03 |
| J | 2 | 840 | 24.17 | 255.5 | 465.8 | 177 | 2.56 |
| K | 3 | 780 | 4 | 112.6 | 479.4 | 132 | 0.61 |
| L | 3 | 780 | 7 | 136.8 | 529.5 | 136 | 0.74 |
| M | 3 | 780 | 16 | 224.9 | 587.3 | 157 | 1.22 |
| N | 3 | 780 | 24.17 | 264.0 | 563.5 | 161 | 1.57 |
| O | 4 | 790 | 4 | 62.6 | 243.2 | 129 | 0.30 |
| P | 4 | 790 | 7 | 76.5 | 277.7 | 141 | 0.40 |
| Q | 4 | 780 | 16 | 114.4 | 408.8 | 145 | 0.60 |
| R | 4 | 780 | 24.17 | 133.0 | 470.8 | 141 | 0.70 |
| S | 5 | 830 | 4 | 18.4 | 74.8 | 133 | 0.07 |
| T | 5 | 830 | 7 | 26.0 | 128.1 | 133 | 0.10 |
| U | 5 | 830 | 16 | 36.0 | 187.4 | 136 | 0.16 |
| V | 5 | 830 | 24.17 | 41.4 | 196 | 138 | 0.19 |
| W | 6 | 790 | 4 | 18.4 | 91 | 126 | 0.09 |
| X | 6 | 790 | 7 | 23.8 | 76.5 | 133 | 0.11 |
| Y | 6 | 790 | 16 | 33.2 | 151.8 | 133 | 0.18 |
| Z | 6 | 740 | 24.17 | 42.9 | 205.6 | 122 | 0.24 |

Additional substrates were formed from the compositions of Table I and subsequently ion exchanged to form example articles. The ion exchange included submerging the substrates into a mixed molten salt bath. The salt bath included a mix of $NaNO_3$, $KNO_3$, and $LiNO_3$ and was at a temperature of 470° C. In Table IV, the length of the ion exchange, the weight gain due to the ion exchange treatment, the maximum central tension (CT), surface compressive stress (CS), and potassium depth of layer (DOL) of the ion exchanged articles are reported.

TABLE IV

| Example | | AA | AB | AC | AD | AE | AF | AG | AH | AI |
|---|---|---|---|---|---|---|---|---|---|---|
| Composition | | 18 | 18 | 18 | 18 | 67 | 67 | 67 | 67 | 67 |
| Thickness (mm) | | 0.56 | 0.61 | 0.57 | 0.68 | 0.61 | 0.57 | 0.57 | 0.61 | 0.63 |
| IOX Conditions | $NaNO_3$ (wt %) | 6.5 | 6.5 | 6.5 | 6.5 | 10 | 10 | 10 | 10 | 10 |
| | $KNO_3$ (wt %) | 93.5 | 93.5 | 93.5 | 93.5 | 90 | 90 | 90 | 90 | 90 |
| | $LiNO_3$ (wt %) | 0 | 0 | 0 | 0 | 0 | 0 | 0 | 0 | 0 |
| | Bath Temperature (° C.) | 470 | 470 | 470 | 470 | 470 | 470 | 470 | 470 | 470 |
| | Time (h) | 2.5 | 7 | 16 | 24 | 4 | 6 | 8 | 10 | 12 |
| Central Stress (MPa) | | — | 900.3 | 775.4 | 763.9 | 685.9 | 661.1 | 635.1 | 623.6 | 607.7 |
| Potassium DOL (μm) | | | 3.9 | 6.7 | 7.9 | 4.9 | 6.2 | 7.1 | 8 | 8.5 |
| Central Tension (MPa) | | 129 | 191.2 | 180.3 | 164.4 | 92.3 | 107.2 | 119.9 | 122.6 | 123.9 |
| SSE (J/m^2) | | 33.2 | 59.9 | 42 | 44.1 | 19.7 | 21.6 | 23.3 | 26.4 | 27.1 |
| Weight gain (%) | | 0.73 | 1.12 | 1.73 | 1.85 | 0.63 | 0.76 | 0.87 | 0.90 | 0.97 |

TABLE IV-continued

| Example | | AJ | AK | AL | AM | AN | AO | AP | AQ | AR |
|---|---|---|---|---|---|---|---|---|---|---|
| | Composition | 69 | 69 | 69 | 69 | 74 | 74 | 74 | 74 | 74 |
| | Thickness (mm) | 0.58 | 0.60 | 0.59 | 0.63 | 0.58 | 0.58 | 0.58 | 0.57 | 0.59 |
| IOX Conditions | NaNO$_3$ (wt %) | 10 | 10 | 10 | 10 | 10 | 10 | 10 | 10 | 10 |
| | KNO$_3$ (wt %) | 90 | 90 | 90 | 90 | 90 | 90 | 90 | 90 | 90 |
| | LiNO$_3$ (wt %) | 0 | 0 | 0 | 0 | 0 | 0 | 0 | 0 | 0 |
| | Bath Temperature (° C.) | 470 | 470 | 470 | 470 | 470 | 470 | 470 | 470 | 470 |
| | Time (h) | 4 | 6 | 8 | 12 | 4 | 6 | 8 | 10 | 12 |
| Central Stress (MPa) | | 866.3 | 829.6 | 793.9 | 752.9 | 753.6 | 723.8 | 707 | 675.8 | 653.4 |
| Potassium DOL (μm) | | 3.8 | 4.2 | 5.5 | 6 | 4.4 | 5.6 | 6.6 | 6.8 | 8.3 |
| Central Tension (MPa) | | 145.7 | 156 | 174.3 | 177.7 | 142.6 | 161.9 | 163.6 | 165.7 | 143.3 |
| SSE (J/m^2) | | 34.7 | 40.3 | 44.5 | 44.6 | 35.1 | 41.5 | 38.3 | 39.8 | 28 |
| Weight gain (%) | | 0.81 | 0.87 | 1.02 | 1.15 | 0.9 | 1.1 | 1.26 | 1.35 | 1.55 |

| Example | | AS | AT | AU | AV | AQ | AX | AY | AZ |
|---|---|---|---|---|---|---|---|---|---|
| | Composition | 79 | 79 | 79 | 79 | 80 | 80 | 80 | 80 |
| | Thickness (mm) | 0.55 | 0.54 | 0.6 | 0.59 | 0.58 | 0.59 | 0.6 | 0.58 |
| IOX Conditions | NaNO$_3$ (wt %) | 10 | 10 | 10 | 10 | 10 | 10 | 10 | 10 |
| | KNO$_3$ (wt %) | 89.7 | 89.7 | 89.7 | 89.7 | 89.7 | 89.7 | 89.7 | 89.7 |
| | LiNO$_3$ (wt %) | 0.3 | 0.3 | 0.3 | 0.3 | 0.3 | 0.3 | 0.3 | 0.3 |
| | Bath Temperature (° C.) | 470 | 470 | 470 | 470 | 470 | 470 | 470 | 470 |
| | Time (h) | 2 | 4 | 6 | 8 | 6 | 8 | 10 | 12 |
| Central Stress (MPa) | | — | 712.44 | 686.54 | 642.33 | 639.53 | 623.71 | 622.4 | 594.8 |
| DOL (μm) | | — | 4.96 | 7.14 | 8.04 | 6.08 | 7.25 | 7.56 | 8.86 |
| Central Tension (MPa) | | 108.72 | 134.21 | 130.18 | 118.1 | 138.44 | 131.85 | 126.11 | 110.23 |
| SSE (J/m^2) | | 20.29 | 25.4 | 24.98 | 21.21 | 26.68 | 26.35 | 23.37 | 16.54 |
| Weight gain (%) | | 0.67 | 0.95 | 1.11 | 1.3 | 1.07 | 1.22 | 1.2 | 1.45 |

| Example | | BA | BB | BC | BD | BE | BF | BG | BH |
|---|---|---|---|---|---|---|---|---|---|
| | Composition | 81 | 81 | 81 | 81 | 82 | 82 | 82 | 82 |
| | Thickness (mm) | 0.59 | 0.6 | 0.58 | 0.6 | 0.58 | 0.55 | 0.57 | 0.56 |
| IOX Conditions | NaNO$_3$ (wt %) | 10 | 10 | 10 | 10 | 10 | 10 | 10 | 10 |
| | KNO$_3$ (wt %) | 89.7 | 89.7 | 89.7 | 89.7 | 89.7 | 89.7 | 89.7 | 89.7 |
| | LiNO$_3$ (wt %) | 0.3 | 0.3 | 0.3 | 0.3 | 0.3 | 0.3 | 0.3 | 0.3 |
| | Bath Temperature (° C.) | 470 | 470 | 470 | 470 | 470 | 470 | 470 | 470 |
| | Time (h) | 6 | 8 | 10 | 12 | 6 | 8 | 10 | 12 |
| Central Stress (MPa) | | 654.64 | 649.32 | 629.81 | 611.28 | 603.89 | 583.3 | 567.54 | 556.06 |
| DOL (μm) | | 5.54 | 6.87 | 7.48 | 8.03 | 6.05 | 6.44 | 7 | 7.87 |
| Central Tension (MPa) | | 126.95 | 132.3 | 125.22 | 124.65 | 86.05 | 102.39 | 100.95 | 104.7 |
| SSE (J/m^2) | | 25.29 | 26.62 | 22.73 | 23.2 | 15.14 | 15.76 | 16.29 | 15.64 |
| Weight gain (%) | | 0.94 | 1.07 | 1.15 | 1.21 | 0.68 | 0.82 | 0.84 | 0.9 |

| Example | | BI | BJ | BK | BL | BM | BN | BO | BP |
|---|---|---|---|---|---|---|---|---|---|
| | Composition | 83 | 83 | 83 | 83 | 84 | 84 | 84 | 84 |
| | Thickness (mm) | 0.6 | 0.6 | 0.57 | 0.58 | 0.59 | 0.61 | 0.6 | 0.59 |
| IOX Conditions | NaNO$_3$ (wt %) | 10 | 10 | 10 | 10 | 10 | 10 | 10 | 10 |
| | KNO$_3$ (wt %) | 90 | 90 | 90 | 90 | 90 | 90 | 90 | 90 |
| | LiNO$_3$ (wt %) | 0.3 | 0.3 | 0.3 | 0.3 | 0.3 | 0.3 | 0.3 | 0.3 |
| | Bath Temperature (° C.) | 470 | 470 | 470 | 470 | 470 | 470 | 470 | 470 |
| | Time (h) | 6 | 8 | 10 | 8 | 4 | 6 | 8 | 10 |
| Central Stress (MPa) | | 638.22 | 613.82 | 596.99 | 583.85 | 727.67 | 706.06 | 693.19 | 675.05 |
| DOL (μm) | | 4.61 | 5.82 | 6.01 | 6.37 | 4.35 | 5.02 | 5.71 | 6.23 |
| Central Tension (MPa) | | 123.63 | 140.62 | 139.45 | 140.5 | 144.44 | 153.95 | 151.9 | 152.43 |
| SSE (J/m^2) | | 29.16 | 29.43 | 26.96 | 27.19 | 32.69 | 37.33 | 34.91 | 33.11 |
| Weight gain (%) | | 0.84 | 1.02 | 1.08 | 1.14 | 0.87 | 0.97 | 1.06 | 1.17 |

Additional substrates were formed from example glass composition 84 and comparative glass composition CA underwent ion exchange under conditions as reported in Table V. Example glass composition 84 was used to produce three ion exchanged glass articles, BQ, BR, and BS and comparative glass composition CA was used to produce comparative ion exchanged glass article CA as reported in Table V. Comparative glass composition CA comprised 58.35 mol % $SiO_2$, 17.81 mol % $Al_2O_3$, 6.07 mol % $B_2O_3$, 1.73 mol % $Na_2O$, 0.20 mol % $K_2O$, 10.74 mol % $Li_2O$, 4.43 mol %, MgO, 0.57 mol % CaO, and 0.08 mol % $SnO_2$.

TABLE V

| Comp. | Na/K/Li (%) | Temp./Time | CS (MPa) | Potassium DOL (μm) | CT (MPa) | SSE (J/m$^2$) | CSk (RNF) (MPa) | DOC (RNF) (μm) |
|---|---|---|---|---|---|---|---|---|
| CA | 9/90.3/0.7 | 450° C./5 hr | 675 | 4.84 | 113 | 17.3 | 138 | 124 |
| BQ | 15/84.5/0.5 | 470° C./6.8 hr | 642 | 4.84 | 124 | 23.8 | 169 | 127 |
| BR | 9/90.8/0.2 | 470° C./4.5 hr | 754 | 4.03 | 111 | 21.3 | 187 | 116 |
| BS | 10/89.8/0.2 | 470° C./4.5 hr | 713 | 4.01 | 112 | 22.5 | 196 | 115 |

Figure 3:
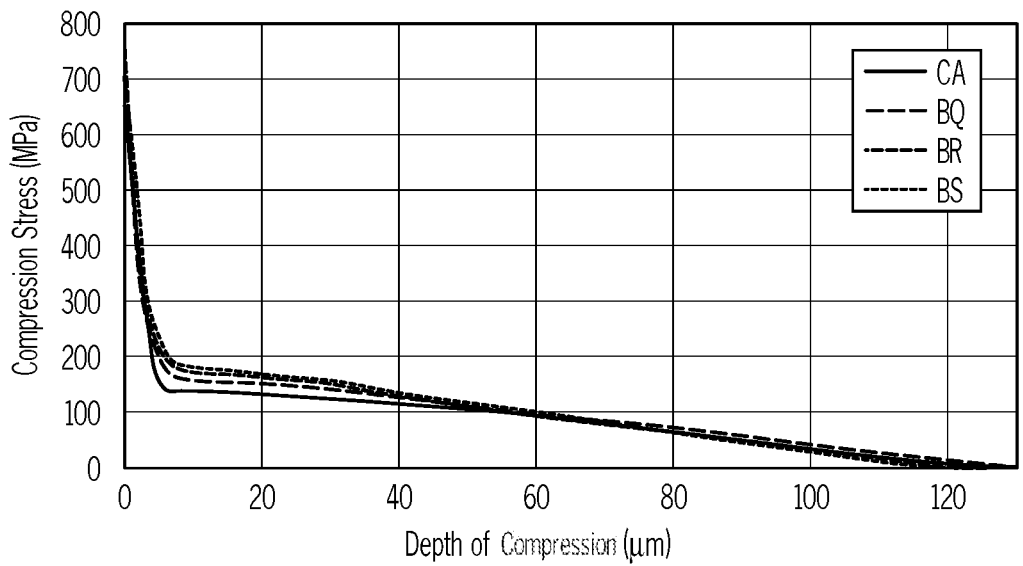
FIG. 3 is a stress profile of example ion-exchanged glass articles and a comparative ion-exchanged glass article.

FIG. 3 shows the stress profiles of example articles BQ, BR, and BS and comparative article CA. Compressive stress was measured using a refractive near field (RNF) technique.

Figure 4:
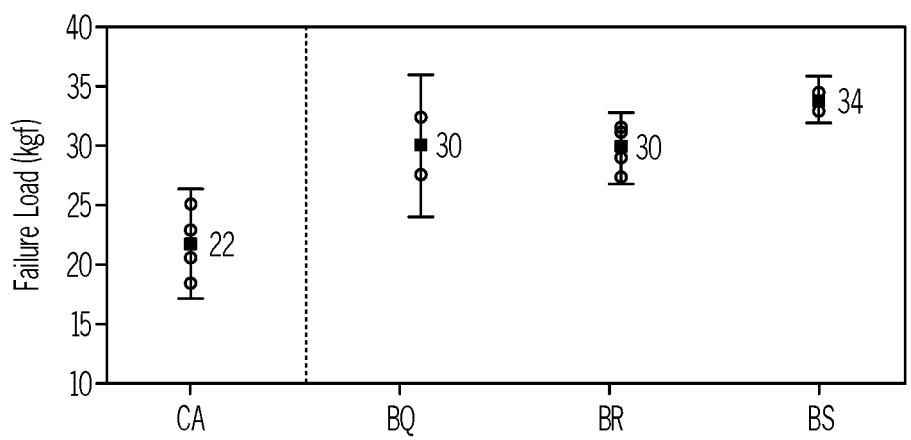
FIG. 4 is a plot of retained strength of an example glass article a comparative glass article.
Figure 5:
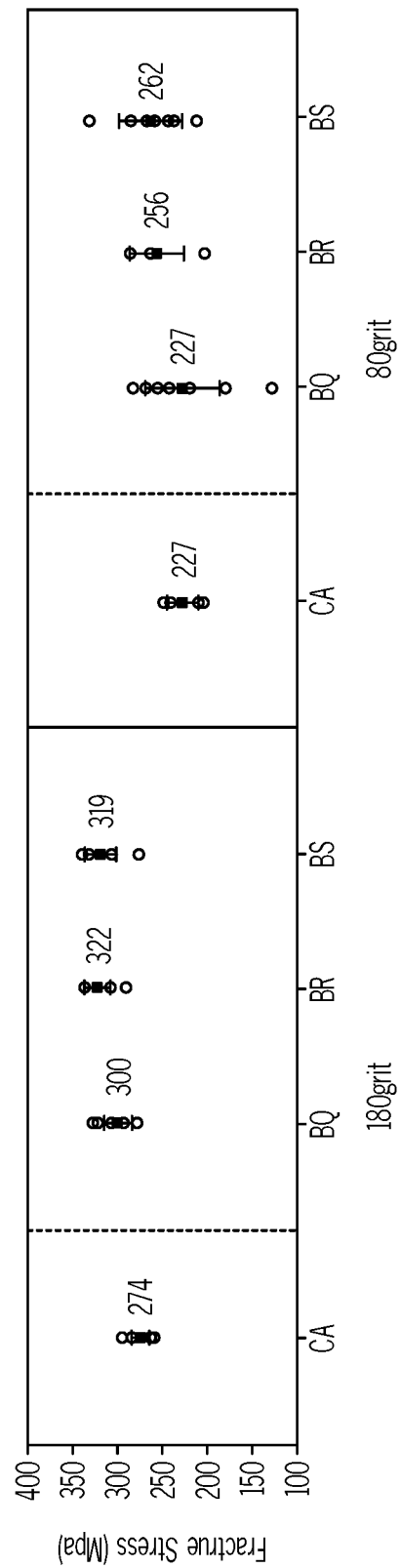
FIG. 5 is a plot of the retained strength of an example glass article and a comparative glass article.

FIGS. 4 and 5 show the retained strength of articles. As shown in FIG. 4, example BQ articles had a failure load ranging from 22.5 kgf to 37.5 kgf with a mean failure load of 30 kgf when impacted with 60 grit sandpaper with a force of 500 N on the edge of the glass article. Example BR articles had a failure load ranging from 25 kgf to 32.5 kgf with a mean failure load of 30 when impacted with 60 grit sandpaper with a force of 500 N on the edge of the glass article. Example BS articles had a failure load ranging from 32.5 kgf to 37.5 kgf with a mean failure load of 34 kgf when impacted with 60 grit sandpaper with a force of 500 N on the edge of the glass article. Comparative example CA articles had a failure load ranging from 17.5 kgf to 27.5 kgf with a mean failure load of 22 kgf when impacted with 60 grit sandpaper with a force of 500 N on the edge.

As shown in FIG. 5, example BQ articles had retained strengths ranging from 275 MPa to 325 MPa with a mean retained strength of 300 MPa when impacted with 180 grit sandpaper with a force of 500 N and retained strengths ranging from 125 MPa to 275 MPa with a mean retained strength of 227 MPa when impacted with 180 grit sandpaper with a force of 500 N. Example BR articles had retained strengths ranging from 275 MPa to 350 MPa with a mean retained strength of 322 MPa when impacted with 180 grit sandpaper with a force of 500 N and retained strengths ranging from 200 MPa to 275 MPa with a mean retained strength of 256 MPa when impacted with 180 grit sandpaper with a force of 500 N. Example BS articles had retained strengths ranging from 250 MPa to 350 MPa with a mean retained strength of 319 MPa when impacted with 180 grit sandpaper with a force of 500 N and retained strengths ranging from 200 MPa to 325 MPa with a mean retained strength of 262 MPa when impacted with 180 grit sandpaper with a force of 500 N. Comparative CA articles had retained strengths ranging from 250 MPa to 300 MPa with a mean retained strength of 274 MPa when impacted with 80 grit sandpaper with a force of 500 N and retained strengths ranging from 200 to 250 MPa with a mean retained strength of 227 MPa when impacted with 180 grit sandpaper with a force of 500 N. As exemplified by FIGS. 4 and 5, ion exchanged glass articles made from the glass compositions described herein have equivalent or improved retained strengths as compared to a comparative ion exchanged glass articles.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass, comprising:
   greater than or equal to 45 mol % to less than or equal to 70 mol % $SiO_2$;
   greater than or equal to 4 mol % to less than or equal to 25 mol % $Al_2O_3$;
   greater than or equal to 5 mol % to less than or equal to 20 mol % $Li_2O$;
   greater than or equal to 0.1 mol % to less than or equal to 10 mol % $Na_2O$;
   greater than or equal to 13 mol % to less than or equal to 25 mol % MgO;
   greater than or equal to 0.1 mol % to less than or equal to 4 mol % $ZrO_2$;
   greater than or equal to 0.1 mol % to less than or equal to 5 mol % $K_2O$; and
   greater than or equal to 0.05 mol % to less than or equal to 0.5 mol % $SnO_2$,
   wherein the glass has a $K_{IC}$ fracture toughness greater than or equal to 0.83 MPa·m$^{0.5}$ and a Young's modulus greater than or equal to 86 GPa, and
   wherein $(Li_2O+Na_2O+MgO)/Al_2O_3$ is greater than or equal to 1.68 and less than or equal to 2.5, where each component concentration is in mol %.

2. The glass of claim 1, comprising:
   greater than or equal to 51 mol % to less than or equal to 65 mol % $SiO_2$.

3. The glass of claim 1, comprising:
   greater than or equal to 12.0 mol % to less than or equal to 19 mol % $Al_2O_3$.

4. The glass of claim 1, comprising:
   greater than or equal to 6 mol % to less than or equal to 12 mol % $Li_2O$.

5. The glass of claim 1, comprising:
   greater than 0.25 mol % to less than or equal to 6 mol % $Na_2O$.

6. The glass of claim 1, comprising:
greater than or equal to 14 mol % to less than or equal to 19 mol % MgO.

7. The glass of claim 1, comprising:
greater than 0.25 mol % to less than or equal to 2 mol % $ZrO_2$.

8. The glass of claim 1, comprising:
greater than or equal to 0 mol % to less than or equal to 10 mol % $B_2O_3$.

9. The glass of claim 1, comprising:
greater than or equal to 0 mol % to less than or equal to 4 mol % $P_2O_5$.

10. The glass of claim 1, comprising:
greater than or equal to 0 mol % to less than or equal to 3 mol % CaO.

11. D) A glass-based article, comprising:
a compressive stress layer extending from a surface of the glass-based article to a depth of compression;
a central tension region; and
a composition at a center of the glass-based article comprising:
greater than or equal to 45 mol % to less than or equal to 70 mol % $SiO_2$;
greater than or equal to 4 mol % to less than or equal to 25 mol % $Al_2O_3$;
greater than or equal to 5 mol % to less than or equal to 20 mol % $Li_2O$;
greater than or equal to 0.1 mol % to less than or equal to 10 mol % $Na_2O$;
greater than or equal to 13 mol % to less than or equal to 25 mol % MgO;
greater than or equal to 0.1 mol % to less than or equal to 4 mol % $ZrO_2$;
greater than or equal to 0.1 mol % to less than or equal to 5 mol % $K_2O$; and
greater than or equal to 0.05 mol % to less than or equal to 0.5 mol % $SnO_2$,
wherein the glass has a $K_{IC}$ fracture toughness greater than or equal to 0.83 MPa·m$^{0.5}$ and a Young's modulus greater than or equal to 86 GPa, and
wherein $(Li_2O+Na_2O+MgO)/Al_2O_3$ is greater than or equal to 1.68 and less than or equal to 2.5, where each component concentration is in mol %.

12. The glass-based article of claim 11, wherein the compressive stress layer comprises a compressive stress greater than or equal to 400 MPa to less than or equal to 2000 MPa.

13. The glass-based article of claim 11, wherein the central tension region comprises a maximum central tension greater than or equal to 30 MPa to less than or equal to 300 MPa.

14. The glass-based article of claim 11, wherein the depth of compression is greater than or equal to 0.15t to less than or equal to 0.25t, where t is the thickness of the glass-based article.

15. The glass-based article of claim 11, wherein the compressive stress layer comprises a compressive stress spike extending from the surface of the glass-based article to a depth of compressive stress spike, and the depth of compressive stress spike is greater than or equal to 3 μm to less than or equal to 10 μm.

16. The glass-based article of claim 11, wherein the glass-based article has a thickness t greater than or equal to 0.2 mm to less than or equal to 2 mm.

17. The glass-based article of claim 11, wherein a glass having the same composition and microstructure as the composition at the center of the glass-based article has a $K_{IC}$ fracture toughness greater than or equal to 0.8 MPa·m$^{0.5}$ to less than or equal to 1.0 MPa·m$^{0.5}$.

18. The glass-based article of claim 11, wherein a glass having the same composition and microstructure as the composition at the center of the glass-based article has a Young's modulus greater than or equal to 80 GPa to less than or equal to 100 GPa.

\* \* \* \* \*

UNITED STATES PATENT AND TRADEMARK OFFICE
CERTIFICATE OF CORRECTION

PATENT NO. : 12,098,094 B2
APPLICATION NO. : 17/973065
DATED : September 24, 2024
INVENTOR(S) : Beall et al.

It is certified that error appears in the above-identified patent and that said Letters Patent is hereby corrected as shown below:

In the Claims

Claim 11, Column 53, Line 17, delete "11. D) A glass-based" and insert -- 11. A glass-based --.

Claim 14, Column 54, Line 17, delete "where tis" and insert -- where t is --.

Signed and Sealed this
Seventh Day of January, 2025

Derrick Brent
*Acting Director of the United States Patent and Trademark Office*